United States Patent
Oga et al.

(10) Patent No.: US 10,703,168 B2
(45) Date of Patent: Jul. 7, 2020

(54) OCCUPANT DETECTION SYSTEM, AND VEHICULAR AIR CONDITIONER HAVING THE SAME

(71) Applicant: DENSO CORPORATION, Kariya, Aichi-pref. (JP)

(72) Inventors: Akira Oga, Kariya (JP); Eitaro Tanaka, Kariya (JP); Haruhiko Watanabe, Kariya (JP); Takuma Yamauchi, Kariya (JP); Takashi Sato, Kariya (JP); Hiroshi Takeda, Kariya (JP); Kazuya Taniguchi, Kariya (JP); Goro Ueda, Kariya (JP); Kazuaki Takemoto, Kariya (JP); Tatsumi Kumada, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 57 days.

(21) Appl. No.: 16/069,318

(22) PCT Filed: Nov. 29, 2016

(86) PCT No.: PCT/JP2016/085444
§ 371 (c)(1),
(2) Date: Jul. 11, 2018

(87) PCT Pub. No.: WO2017/122446
PCT Pub. Date: Jul. 20, 2017

(65) Prior Publication Data
US 2019/0009640 A1    Jan. 10, 2019

(30) Foreign Application Priority Data

Jan. 15, 2016 (JP) .................................. 2016-005970
Oct. 12, 2016 (JP) .................................. 2016-200771

(51) Int. Cl.
*B60H 1/00* (2006.01)
*G01V 8/10* (2006.01)
*G01V 9/00* (2006.01)

(52) U.S. Cl.
CPC .......... *B60H 1/00742* (2013.01); *G01V 8/10* (2013.01); *G01V 9/005* (2013.01); *B60H 1/00792* (2013.01)

(58) Field of Classification Search
CPC ............ B60H 1/00028; B60H 1/00871; B60H 1/00472; B60H 1/00792; G01V 8/10; G01V 9/005
(Continued)

(56) References Cited

U.S. PATENT DOCUMENTS 6,012,297 A * 1/2000 Ichishi ............... B60H 1/00871
165/203
2012/0252341 A1* 10/2012 Maehata ............ B60H 1/00028
454/75
(Continued)

FOREIGN PATENT DOCUMENTS

JP        S63255116 A    10/1988
JP        H11295440 A    10/1999
(Continued)

*Primary Examiner* — David D Hwu
(74) *Attorney, Agent, or Firm* — Harness, Dickey & Pierce, P.L.C.

(57) ABSTRACT

An occupant detection system includes a state detection unit that detects a state of an object, a detection position changing unit that changes a position of a detection region, the detection region being a region in which state is detected by the state detection unit, and a controller that controls an operation of the detection position changing unit. In this occupant detection system, a position of the detection region is set to a predetermined initial position during a period of (Continued)

time from when a start switch provided in the vehicle is turned off until when the start switch is turned on.

22 Claims, 15 Drawing Sheets

(58) Field of Classification Search
USPC .......................................................... 165/203
See application file for complete search history.

(56) References Cited

U.S. PATENT DOCUMENTS

| | | |
|---|---|---|
| 2015/0152852 A1 | 6/2015 | Li et al. |
| 2015/0219078 A1 | 8/2015 | Li et al. |

FOREIGN PATENT DOCUMENTS

| | | |
|---|---|---|
| JP | 2004359133 A | 12/2004 |
| JP | 2005059821 A | 3/2005 |
| JP | 4062124 B2 | 3/2008 |
| JP | 2016042783 A | 3/2016 |
| WO | WO-2014054135 A1 | 4/2014 |

* cited by examiner

OCCUPANT DETECTION SYSTEM, AND VEHICULAR AIR CONDITIONER HAVING THE SAME

CROSS-REFERENCE TO RELATED APPLICATIONS

This application is a U.S. National Phase Application under 35 U.S.C. 371 of International Application No. PCT/JP2016/085444 filed on Nov. 29, 2016 and published in Japanese as WO 2017/122446 A1 on Jul. 20, 2017. This application is based on and claims the benefit of priority from Japanese Patent Application No. 2016-005970 filed on Jan. 15, 2016 and Japanese Patent Application No. 2016-200771 filed on Oct. 12, 2016. The entire disclosures of all of the above applications are incorporated herein by reference.

TECHNICAL FIELD

The present disclosure relates to an occupant detection system for detecting a state of an occupant and a vehicular air conditioner including the occupant detection system.

BACKGROUND ART

In recent years, some vehicles are provided with an occupant detection system for detecting the state of occupants. As such an occupant detection system, for example, there are systems for measuring the surface temperature of an occupant with an infrared sensor and appropriately controlling air conditioning based on the measurement result. In addition, there are devices that identify an occupant through facial recognition using a camera and then enable automatic setting of a seat position or the like based on that occupant.

A vehicular air conditioner described in the following Patent Literature 1 is provided with an occupant detection system for measuring the surface temperature and position of an occupant using an infrared sensor. In this occupant detection system, the infrared sensor is disposed on a swing louver provided in a vent hole to calculate the surface temperature of the occupant. The vehicular air conditioner performs air conditioning control based on the calculated surface temperature.

In such a configuration, the direction of the infrared sensor periodically changes within a certain range in accordance with the swing of the swing louver. In other words, instead of measuring the surface temperatures of all the occupants in one measurement and at the same time, a local range is measured. As such, the entire temperature distribution is detected by gradually moving the local range while. Accordingly, it is possible to perform temperature measurement over a wide range including any occupants while using an inexpensive infrared sensor having a comparatively narrow detection range.

PRIOR ART LITERATURES

Patent Literature

Patent Literature 1: JP 4062124 B

SUMMARY OF THE INVENTION

Incidentally, in order to properly perform air conditioning in the vehicle cabin from the beginning, it is preferable that the surface temperature of the occupant be measured at the earliest possible timing. Ideally, it is desirable that measurement begins when the occupant opens the door and enters the vehicle.

However, in the occupant detection system as described in the above mentioned Patent Literature 1, since the direction of the infrared sensor when the occupant opens the door is indeterminate, it may not be possible to measure the surface temperature of the occupant at an earlier timing as described above.

Further, even in an occupant detection system that identifies an occupant through facial recognition using a camera and automatically sets a seat position or the like according to that occupant, the facial authentication of the occupant is ideally performed before the occupant sits on the seat. That is, when the occupant opens the door, it is desirable that the camera is oriented toward the direction of the door.

An object of the present disclosure is to provide an occupant detection system capable of detecting a state of an occupant while moving a detection region and also capable of starting detecting the state of the occupant entering a vehicle at an early timing, and to provide a vehicular air conditioner including the same.

Means for Solving the Problem

An occupant detection system according to the present disclosure is an occupant detection system (101) provided in a vehicle (10) that detects a state of an occupant, including a state detection unit (131) that detects a state of an object, a detection position changing unit (132) that changes a position of a detection region, the detection region being a region in which state is detected by the state detection unit, and a controller (110) that controls an operation of the detection position changing unit. In this occupant detection system, a position of the detection region is set to a predetermined initial position during a period of time from when a start switch (141) provided in the vehicle is turned off until when the start switch is turned on.

In the occupant detection system having such a configuration, at a time before the start switch such as an ignition switch is turned on, the operation of the detection region changing unit is controlled such that the position of the detection region is set in advance to a predetermined initial position. Therefore, for example, if the initial position is set at a position where the door provided in the vehicle overlaps the detection region, detection of the state (for example, surface temperature) of the occupant can be started at the time of the occupant opening the door and entering the vehicle.

According to the present disclosure, an occupant detection system capable of detecting a state of an occupant while moving a detection region and also capable of starting detecting the state of the occupant entering a vehicle at an early timing, and a vehicular air conditioner including the same, are provided.

EMBODIMENTS FOR CARRYING OUT INVENTION

Figure 1:
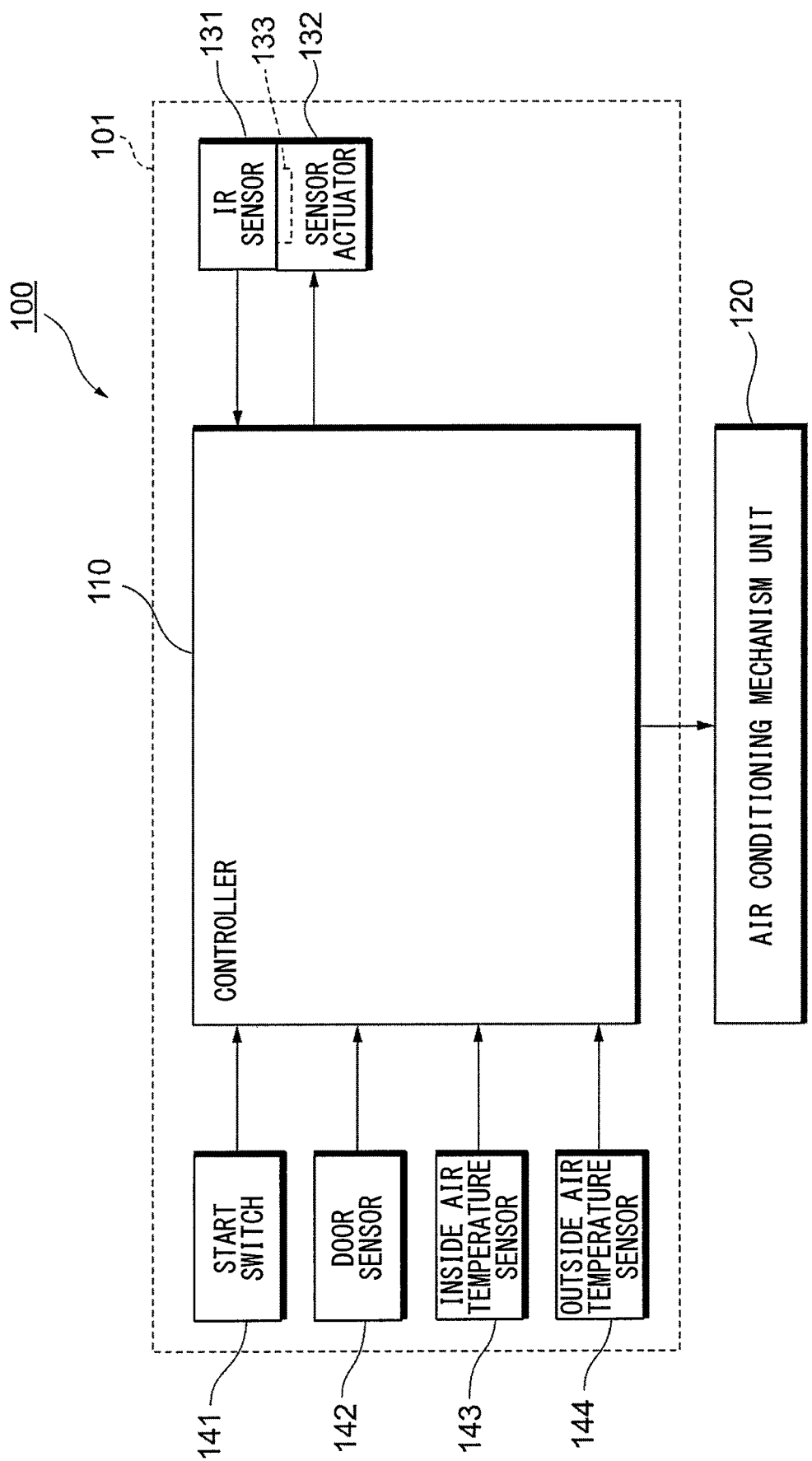
FIG. 1 is a diagram schematically showing a configuration of an occupant detection system according to a first embodiment and a vehicular air conditioner including this occupant detection system.

Hereinafter, the present embodiments will be described with reference to the attached drawings. In order to facilitate the ease of understanding, the same reference numerals are attached to the same constituent elements in each drawing where possible, and redundant explanations are omitted.

An occupant detection system 101 according to a first embodiment will be described with reference to FIGS. 1 and 2. A vehicle 10 in which the occupant detection system 101 is mounted is provided with a vehicular air conditioner 100 for performing air conditioning in a passenger compartment RM. The occupant detection system 101 is a system for detecting the state (specifically, the surface temperature) of an occupant, and is a part of the vehicular air conditioner 100.

In the following description, configurations and controls in the case where the occupant detection system 101 is provided in the vehicular air conditioner 100 will be described, but the occupant detection system 101 may be included in devices other than the vehicular air conditioner 100 instead.

As shown in FIG. 1, the occupant detection system 101 includes a controller 110, an IR sensor 131, and a sensor actuator 132. These elements together with an air conditioning mechanism unit 120 form the vehicular air conditioner 100.

The controller 110 is a device for controlling the overall operation of the occupant detection system 101. The controller 110 is configured as a computer system having a CPU, a ROM, a RAM, and the like. The controller 110 in the present embodiment is configured to control the overall operation of the vehicular air conditioner 100 including the occupant detection system 101. In an alternative embodiment, an air conditioning ECU for controlling the operation of the vehicular air conditioner 100 may be provided separately. In this case, the controller 110 of the occupant detection system 101 would (indirectly) control the operation of the vehicular air conditioner 100 by communicating with the air conditioning ECU.

The state of a start switch 141 provided in the vehicle 10 is input to the controller 110. The start switch 141 is a switch operated by a driver to activate the vehicle 10 to switch to a state capable of traveling. For example, the start switch 141 may be an ignition switch. When the start switch 141 is turned off, the vehicle 10 is in a stopped state. When the start switch 141 is turned on, the vehicle 10 is activated and is ready to run.

The controller 110 receives detection results and measurement values from each of a door sensor 142, an inside air temperature sensor 143, and an outside air temperature sensor 144 provided in the vehicle 10. The door sensor 142 is a sensor for individually detecting the opening and closing states of doors D1, D2, D3, D4 provided in the vehicle 10. In addition, the door sensor 142 can also detect the lock state of each door. The inside air temperature sensor 143 is a sensor for detecting the temperature in the passenger compartment RM (see FIG. 2). The outside air temperature sensor 144 is a sensor for detecting air temperature outside of the vehicle 10.

The controller 110 controls the operation of the air conditioning mechanism unit 120, which will be described later, based on measurement values etc. input from the various sensors described above as well from the IR sensor 131, which will be described later. As a result, air conditioning may be appropriately performed in the passenger compartment RM by the vehicular air conditioner 100. The specific contents of the control processes performed by the controller 110 will be described later.

The IR sensor 131 is a sensor that detects a state (specifically, a surface temperature) of an object in the passenger compartment RM based on radiation (infrared rays) from that object. The IR sensor 131 is provided as a temperature sensor that detects the surface temperature of an occupant riding in the vehicle 10 so that air conditioning may be appropriately performed based on that surface temperature. The surface temperature detected by the IR sensor 131 is input to the controller 110. The IR sensor 131 corresponds to a "state detection unit" in the present embodiment.

The sensor actuator 132 is a driving device for changing the orientation of the IR sensor 131. The sensor actuator 132 has a rotating electrical machine 133 as an actuator for changing the orientation of the IR sensor 131. The rotating electrical machine 133 rotates its rotating shaft (not shown) when supplied with electric power to change the left-right orientation of the IR sensor 131 which is fixed to the rotating shaft.

When the rotating electrical machine 133 is driven and the orientation of the IR sensor 131 is changed, the location of an area where surface temperature is detected by the IR sensor 131 (hereinafter referred to as "detection region") changes. The operation of the sensor actuator 132, that is, the operation of the rotating electrical machine 133 is controlled by the controller 110. The sensor actuator 132 corresponds to a "detection region changing unit" in the present embodiment.

As described above, the air conditioning mechanism unit 120 is a part of the vehicular air conditioner 100 and is a mechanism unit for performing air conditioning in the passenger compartment RM. The air conditioning mechanism unit 120 includes a compressor, a condenser, an evaporator, a throttle valve, a blower fan, and the like (not shown), and all of the elements together form a refrigeration cycle. In the present embodiment, the controller 110 controls the rotation speed of the blower fan, the opening degree of the throttle valve, the operation of various doors (not shown) provided in the air conditioning mechanism unit 120, and the like, thereby adjusting the temperature of air blown into the inside of the passenger compartment RM. Since the specific configuration of the air conditioning mechanism unit 120 is well known, specific illustrations and descriptions are omitted.

The configuration of the interior of the vehicle 10 in the passenger compartment RM will be described with reference to FIG. 2. A driver seat 21 which is a seat on the right side and a passenger seat 22 which is a seat on the left side are provided on the front side portion in the passenger compartment RM so as to be adjacent to each other. Further, in the rear side portion, a first rear seat 23 which is a right side seat and a second rear seat 24 which is a left side seat are provided so as to be adjacent to each other. FIG. 2 shows a driver M1 seated in the driver seat 21, a passenger M2 seated in the passenger seat 22, a passenger M3 seated in the first rear seat 23, and a passenger M4 seated in the second rear seat 24. The reference numeral 25 indicates a steering wheel.

An instrument panel 26 is provided further on the front side of the driver seat 21 and the passenger seat 22. A blowout port 27 is formed in the central portion of the instrument panel 26 in the left-right direction. The blowout port 27 is an outlet for air whose temperature has been adjusted by the vehicular air conditioner 100, i.e., conditioned air. Conditioned air is blown out from the blowout port 27, thereby performing air conditioning in the passenger compartment RM.

The IR sensor 131 is installed on the upper surface of the instrument panel 26. In particular, the IR sensor 131 is arranged in the center of the instrument panel 26 along the left-right direction. As described above, the IR sensor 131 is a temperature sensor for detecting the surface temperature of the occupants in the vehicle 10. The IR sensor 131 is mounted on the upper surface of the instrument panel 26 via the sensor actuator 132.

Figure 2:
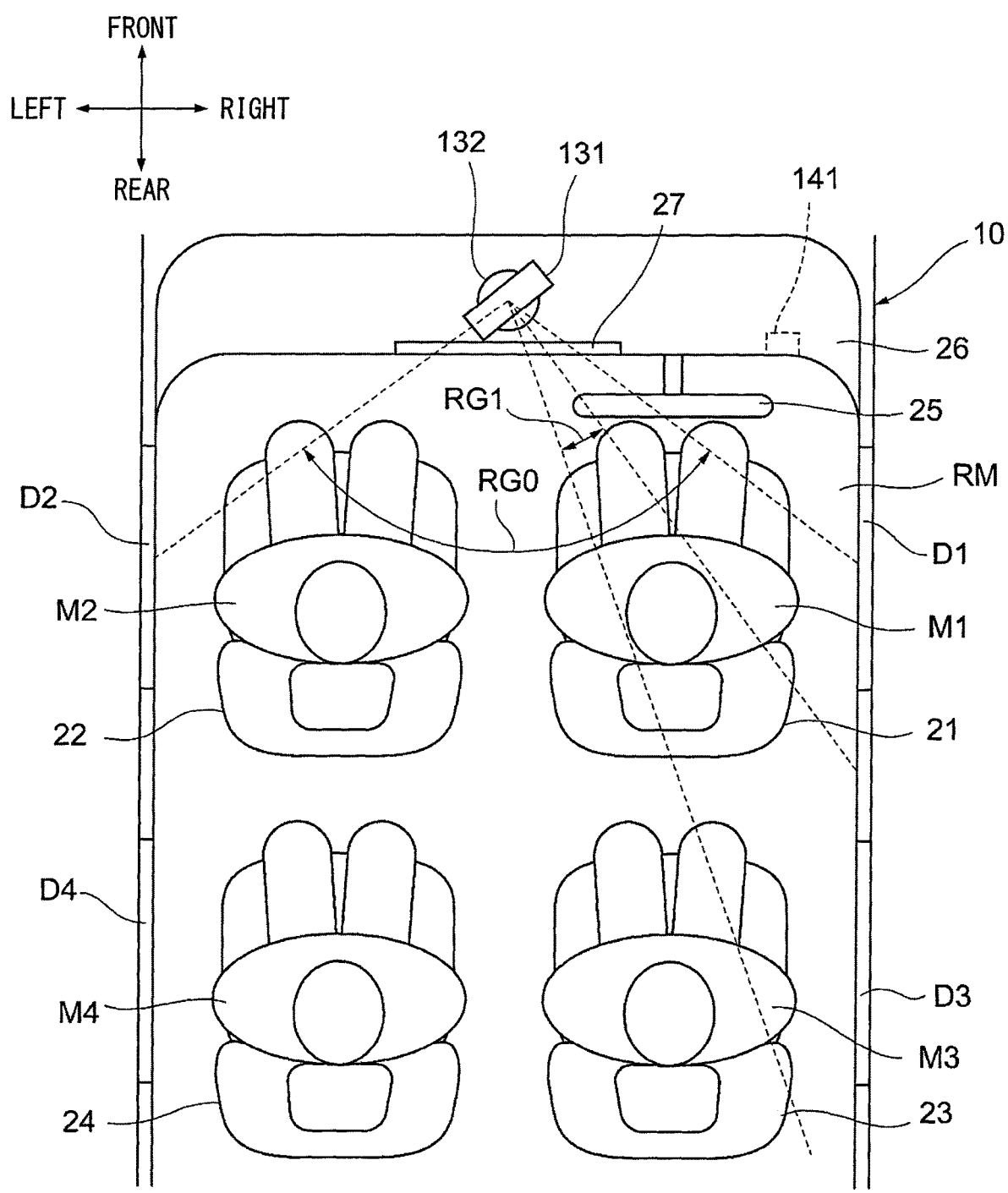
FIG. 2 is a top view diagram schematically depicting the inside of a passenger compartment of a vehicle in which an air conditioner for a vehicle is mounted.

In FIG. 2, a range in which surface temperature can be detected by the IR sensor 131 in one detection is shown as a range RG1. In the present embodiment, a sensor with a relatively narrow angle is used as the IR sensor 131. Since the range RG1 in which surface temperature can be detected at once by the IR sensor 131 is narrow, it is impossible to simultaneously detect the surface temperatures of all occupants (the driver M1 and the passengers M2, M3, M4) at the same time in one detection.

Therefore, in the present embodiment, the direction of the IR sensor 131 is changed by the operation of the sensor actuator 132, and as a result the surface temperatures of each passenger is detected sequentially. More specifically, the sensor actuator 132 periodically swings the IR sensor 131 to the left and right, thereby periodically changing the position of the detection region to detect the surface temperature of each part in the passenger compartment RM.

In FIG. 2, the entire range in which surface temperature can be detected by the swinging of the IR sensor 131 is shown as a range RG0. When the IR sensor 131 swings, the orientation of the range RG1 changes within the range RG0. That is, the location of the detection region moves left and right within the range RG0. In the state shown in FIG. 2, a part of the surface of the driver M1 is in the detection region.

The range RG0 is set as a range including the surfaces of all seated passengers (the driver M1 and the passengers M2, M3, M4).

The vehicle 10 is provided with four doors. The door D1 on the side of the driver seat 21 is a door provided at a position on the right side and toward the front side of the vehicle 10. The door D1 is a door that can be opened when the driver M1 enters the vehicle 10. The door D2 on the passenger seat 22 side is a door provided at a position on the left side and toward the front side of the vehicle 10. The door D2 is a door that can be opened when the passenger M2 enters the vehicle 10.

The door D3 on the side of the first rear seat 23 is a door provided at a position on the right side and toward the rear side of the vehicle 10. The door D3 is a door that can be opened when the passenger M3 enters the vehicle 10. The door D4 on the side of the second rear seat 24 is a door provided at a position on the left side and toward rear side of the vehicle 10. The door D4 is a door that can be opened when the passenger M4 enters the vehicle 10.

At least a part of each door (D1, D2, D3, D4) is included in the range RG0 when closed. In other words, the range RG0 in which surface temperature can be detected is set to be such a range.

Further, the IR sensor 131 may be installed in a place higher than the upper surface of the instrument panel 26, e.g., on an overhead console (not shown) on the ceiling. It is preferable that the installation location of the IR sensor 131 is a place where radiation from the surface of each occupant can directly reach and a place where radiation from the position of each door can also directly reach.

When the start switch 141 is turned on, the controller 110 controls the sensor actuator 132 so that the IR sensor 131 swings left and right such that the position of the detection region periodically moves right and left within the range RG0. As a result, the surface temperature of each passenger is sequentially detected. The controller 110 controls air conditioning in the passenger compartment RM by considering the air temperature in the passenger compartment RM detected by the inside air temperature sensor 143, the outside air temperature detected by the outside air temperature sensor 144, and the surface temperature of each passenger detected by the IR sensor 131. By performing the air conditioning control while also taking account of the surface temperature of the occupants, the thermal sensation felt by each occupant can be made appropriate.

When the vehicle 10 is stopped and the start switch 141 is turned off, the swinging of the IR sensor 131 is stopped. At this time, if the IR sensor 131 is stopped in a state of facing the passenger seat 22, for example, the surface temperature of the driver M1 will not be immediately measured when the driver M1 enters the vehicle 10 next time. In other words, a part of the surface of the driver M1 will not be in the detection region until a certain period of time passes after the driver M1 enters the vehicle 10. As a result, adequate air conditioning based on the surface temperature of the driver M1 will not be immediately performed, so there is a concern that the driver M1 may be temporarily uncomfortable.

Therefore, in the vehicular air conditioner 100 according to the present embodiment, the direction of the IR sensor 131 (that is, the position of the detection region) is shifted in advance toward an appropriate direction before the start switch 141 is turned on again.

Figure 3:
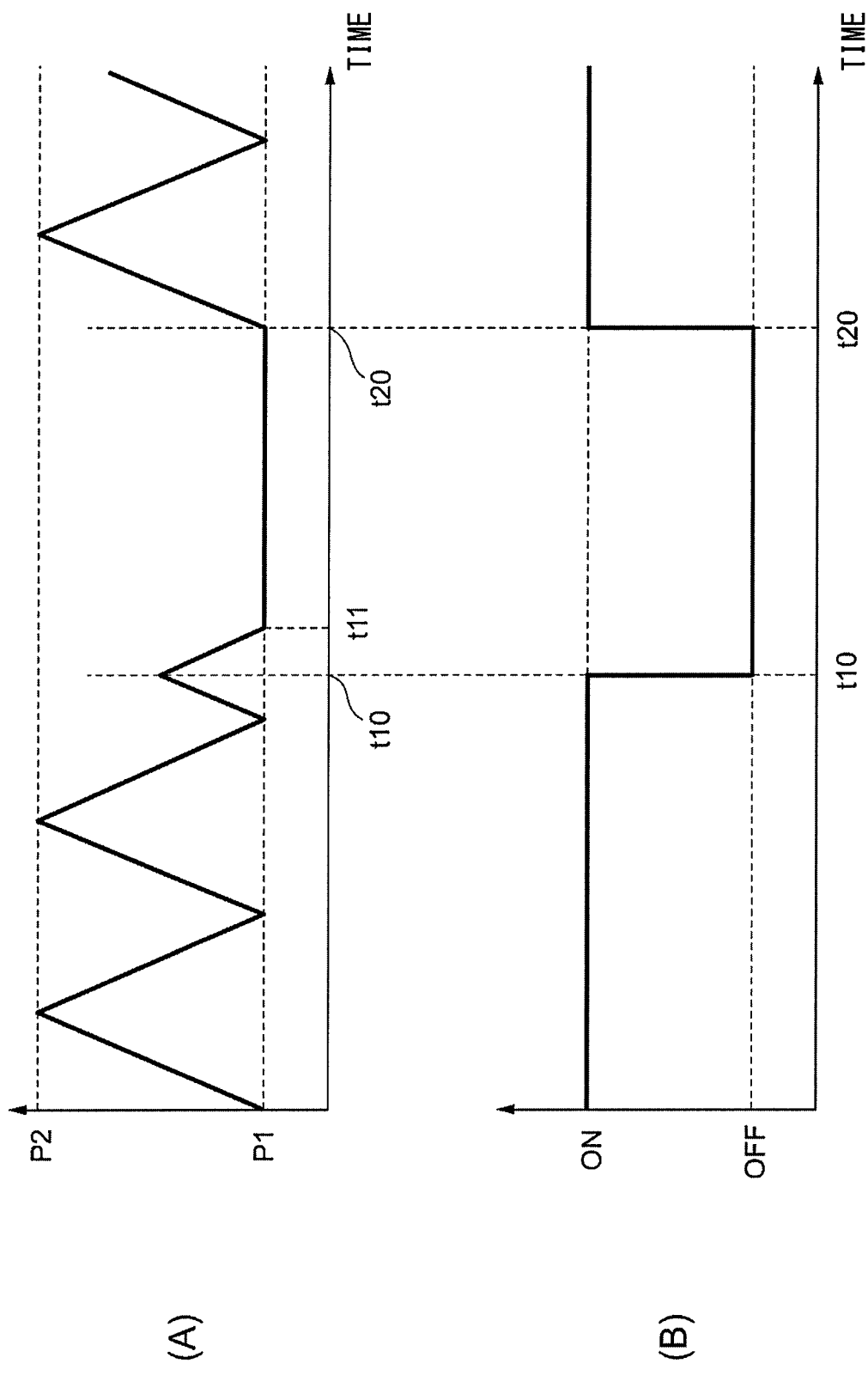
FIG. 3 is a view for explaining changes in orientation of an IR sensor.

The operation of such an IR sensor 131 will be described with reference to FIG. 3. FIG. 3(A) shows change over time for the direction in which the IR sensor 131 is facing. In FIG.

3(A), the orientation of the IR sensor 131 is shown as changing between a direction P1 which is the direction of the driver M1 and a direction P2 which is the direction of the passenger M2. When the IR sensor 131 is facing in the direction P1, the range RG1 in FIG. 2 is on the right-most side of the range RG0. Further, when the IR sensor 131 is facing in the direction P2, the range RG1 in FIG. 2 is on the left-most side of the range RG0.

FIG. 3(B) shows change over time for the state of the start switch 141. In FIG. 3(B), it is shown that the start switch 141 is switched from ON to OFF at time t10. After that, at time t20, it is shown that the start switch 141 is switched from OFF to ON.

In the period of time before time t10, the start switch 141 is in the ON state as described above, and air conditioning in the passenger compartment RM is performed by the vehicular air conditioner 100. At this time, the IR sensor 131 is driven by the sensor actuator 132 and performs the swinging motion as described above. Accordingly, the state in which the IR sensor 131 faces the direction P1 and the state in which the IR sensor 131 faces the direction P2 are periodically repeated. That is, the surface temperature of each part in the range RG0 is continuously scanned by the IR sensor 131.

At time t10 when the start switch 141 is turned off, the IR sensor 131 is in a state of facing between the driver seat 21 and the passenger seat 22. At this point, the controller 110 does not stop the sensor actuator 132, but rather continues to operate the sensor actuator 132. Specifically, from the moment that the start switch 141 is turned off (time t10), the direction of the IR sensor 131 is shifted toward the right side (that is, the position of the detection region is moved to the right side) so the IR sensor 131 faces in the direction P1. Thereafter, the controller 110 stops the sensor actuator 132. The time at this time is shown as time t11 in FIG. 3.

The speed at which the direction of the IR sensor 131 is changed during the period from time t10 to time t11 may be different from the speed during normal operation time (i.e., prior to time t10 or after time t20). During normal operation, the sensing process is also performed while changing the orientation of the IR sensor 131. Accordingly, due to signal processing time, the IR sensor 131 can not be moved fast. However, sensing does not need to be performed from t10 to t11. For this reason, the IR sensor 131 may be moved faster than during normal operation.

Figure 4:
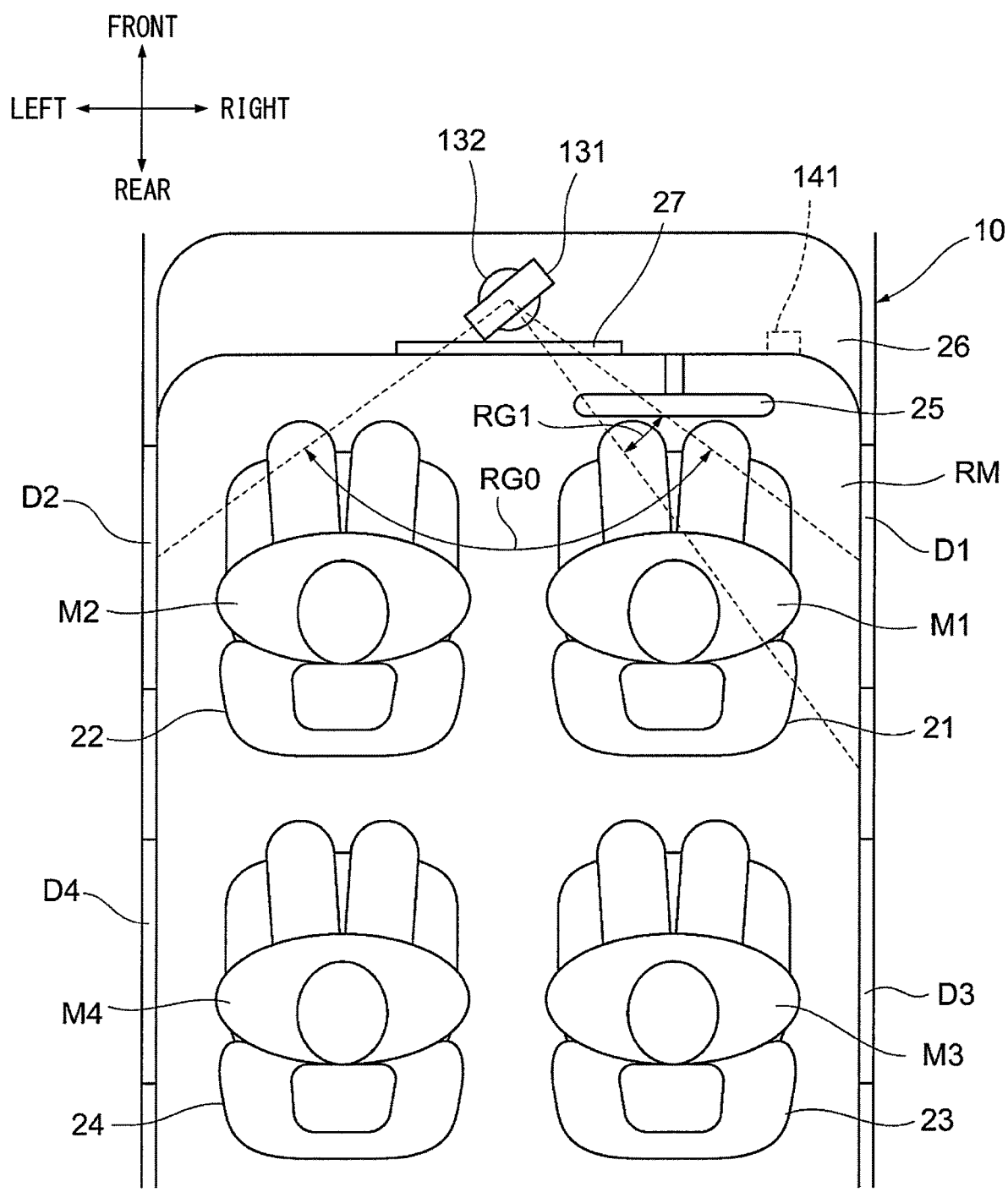
FIG. 4 is a top view diagram schematically depicting the inside of a passenger compartment of a vehicle in which an air conditioner for a vehicle is mounted.

After time t11, the detection target region is positioned on the right-most side of the movable range. The state at this time is shown in FIG. 4. As shown in this figure, the range RG1 is on the right-most side of the range RG0, and a part of the door D1 is included in the range RG1. In other words, the detection region overlaps with at least a part of the door D1 provided on the driver seat side in the vehicle 10. This position of the detection region corresponds to an "initial position" in the present embodiment.

After time t10, all the passengers will exit the stopped vehicle 10, so that no passengers are in the passenger compartment RM.

Thereafter, when the vehicle 10 is used again, the driver M1 will open the door D1 to enter the vehicle 10. At this time, as described above, the position of the detection region overlaps with a part of the (closed) door D1. Therefore, immediately after the door D1 is opened, the surface temperature of at least a part of the driver M1 can be detected by the IR sensor 131.

When the driver M1 enters the vehicle 10 and the start switch 141 is turned on again (time t20), the controller 110 starts operating the sensor actuator 132. As a result, the swing motion of the IR sensor 131 is restarted, and the surface temperature of each passenger is sequentially detected.

Figure 5:
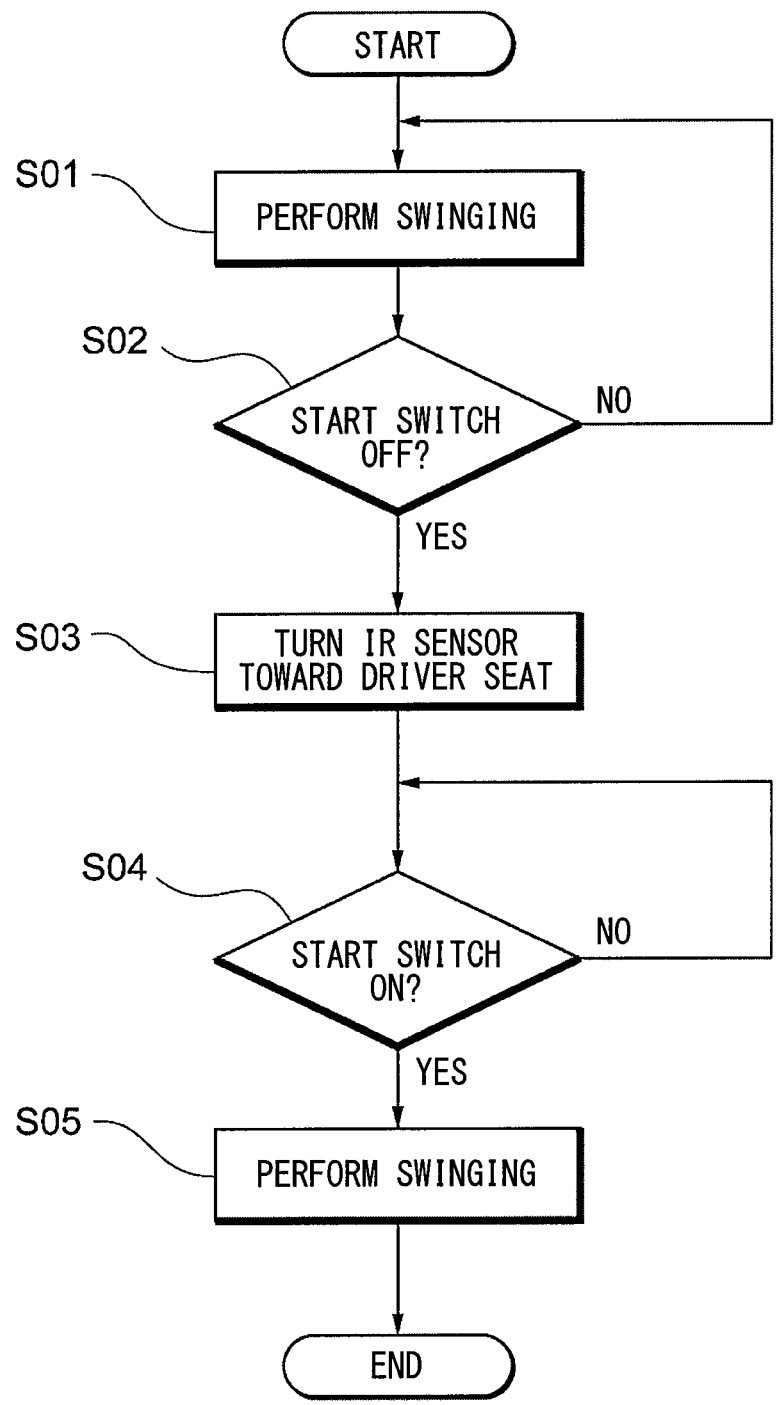
FIG. 5 is a flowchart showing a flow of a process executed by a controller of an occupant detection system.

Processing steps executed by the controller 110 will be described with reference to FIG. 5. This processing is performed in order to operate the IR sensor 131 and the sensor actuator 132 as described above. The series of processing steps shown in FIG. 5 is repeatedly executed each time a predetermined period elapses.

In the first step S01, the swinging motion of the IR sensor 131 is performed. As described above, this swinging motion is executed when the controller 110 operates the sensor actuator 132 while the start switch 141 is on.

In step S02 following step S01, it is determined whether or not the start switch 141 is turned off. If the start switch 141 remains on, the process of step S01 is repeatedly executed. If the start switch 141 is off, the process proceeds to step S03.

In step S03, a process of operating the sensor actuator 132 to direct the IR sensor 131 toward the driver seat 21 is performed. Specifically, the controller 110 performs a process of controlling the operation of the rotating electrical machine 133 (actuator) so that the position of the detection region becomes a predetermined initial position.

Through this processing, the detection region moves to the right side toward the initial position, and finally reaches the state (initial position) shown in FIG. 4. The process of step S03 corresponds to the process executed in the period from time t10 to time t11 in FIG. 3.

In step S04 following step S03, it is determined whether or not the start switch 141 is turned on. If the start switch 141 remains off, the process of step S04 is repeatedly executed. The period in which the processing of step S04 is repeatedly executed corresponds to the period from time t11 to time t20 in the example of FIG. 3. If the start switch 141 is on in step S04, the process proceeds to step S05.

In step S05, the swinging motion of the IR sensor 131 is performed. The swinging motion here is the same as the operation performed in step S01. The processing performed after proceeding to step S05 corresponds to the processing performed after time t20 in FIG. 3.

Figure 6:
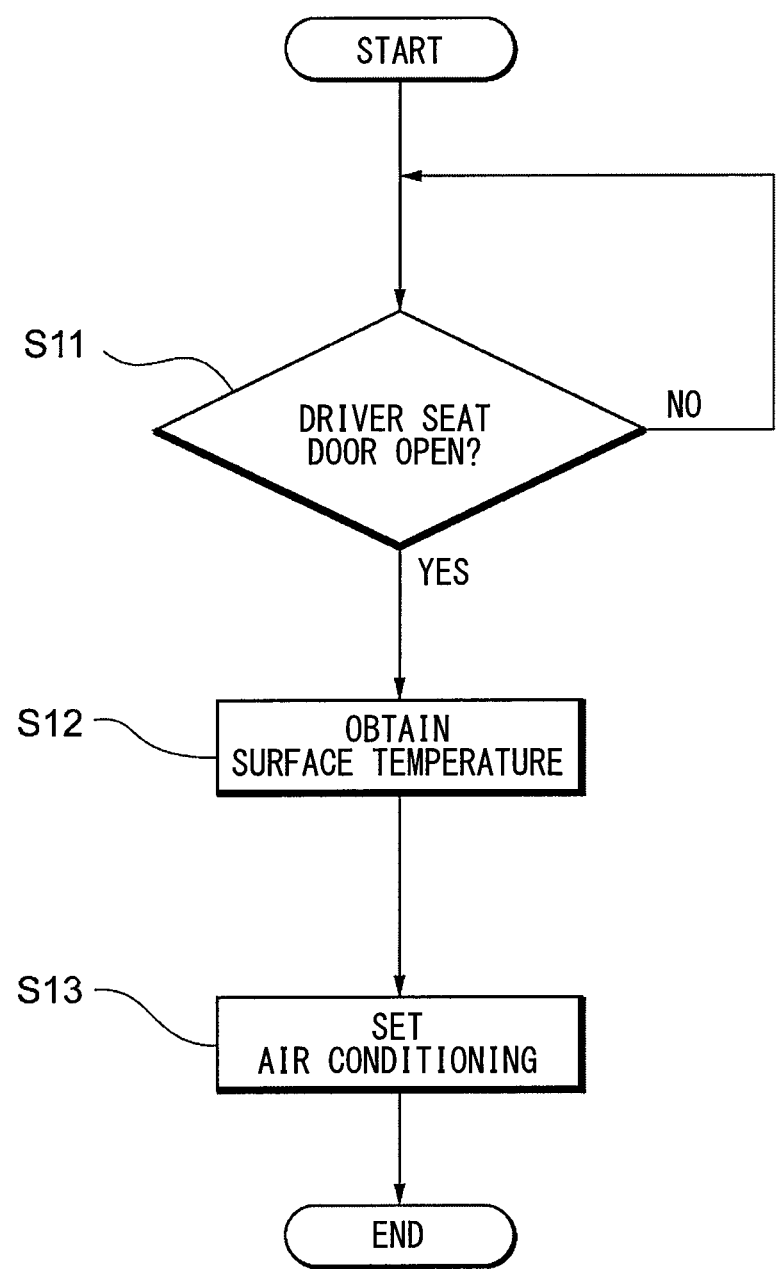
FIG. 6 is a flowchart showing a flow of a process executed by a controller of an occupant detection system.

The processing performed when the driver M1 enters the vehicle 10 after time t11 in FIG. 3 will be described with reference to FIG. 6. The series of processing steps shown in FIG. 6 is repeatedly executed each time a predetermined period elapses. Further, the series of processing steps shown in FIG. 6 is executed in parallel with the series of processing steps shown in FIG. 5.

In the first step S11, it is determined whether or not the door D1 on the side of the driver seat 21 is opened. This determination is made based on information input from the door sensor 142. If the door D1 is not opened, the process of step S11 is repeatedly executed. If the door D1 is open, the process proceeds to step S12.

In step S12, the surface temperature of the driver M1 is detected by the IR sensor 131. At this time, since the IR sensor 131 is already facing toward the driver seat 21, the surface temperature of the driver M1 is detected at the same time as the door D1 is opened. At this point in time, the driver M1 is not inside the passenger compartment RM and is standing outside the vehicle 10. The IR sensor 131 detects the surface temperature of the driver M1 through an opening formed by opening the door D1.

The surface temperature of the driver M1 detected at this time is substantially the surface temperature of the entire body of the driver M1, including the lower body of the driver M1. The controller 110 stores the acquired surface temperature of each part of the driver M1 as an initial value of the temperature of each part. Here, the "lower body" of the driver M1 refers to a part of the driver M1 that becomes obscured from the position of the IR sensor 131 when the driver M1 is seated in the driver seat 21. When the IR sensor 131 is installed on top of the instrument panel 26 as in the present embodiment, the "lower part" generally refers to the parts of the driver M1 which are below the waist of the driver M1.

In step S13 subsequent to step S12, various parameters for controlling the air conditioning mechanism unit 120 are set based on the surface temperature of the driver M1 acquired in step S12. Thereafter, air conditioning by the vehicular air conditioner 100 is started.

Further, after the driver M1 is seated in the driver seat 21, only the surface temperature of the upper body of the driver M1 is detected, and the surface temperature of the lower body of the driver M1 is not detected. However, in the present embodiment, the surface temperature of the lower body is acquired as an initial value in step S12. Therefore, the controller 110 can estimate the surface temperature (change from the initial value) of the lower body after the driver M1 is seated in the driver seat 21. This makes it possible to perform more appropriate air conditioning while considering the overall surface temperature of the driver M1.

As described above, according to the vehicular air conditioner 100 of the present embodiment, at a time before the start switch 141 is turned on, the operation of the detection region changing unit is controlled such that the position of the detection target area is set in advance to a predetermined initial position. The "initial position" in the present embodiment is a position (FIG. 4) where the detection region overlaps with at least a part of the door D1. Since the surface temperature of the driver M1 can be measured starting from the time when the driver M1 opens the door and enters the vehicle 10, the air conditioning in the passenger compartment RM can be appropriately performed from the beginning of driving.

In many cases, it is assumed the driver M1 first enters the vehicle 10. However, there is a possibility another passenger will enter first, before the driver M1. Therefore, according to the vehicular air conditioner 100, when a door (D2, D3, D4) other than the door D1 is opened first, a process of directing the IR sensor 131 toward that door is performed.

Figure 7:
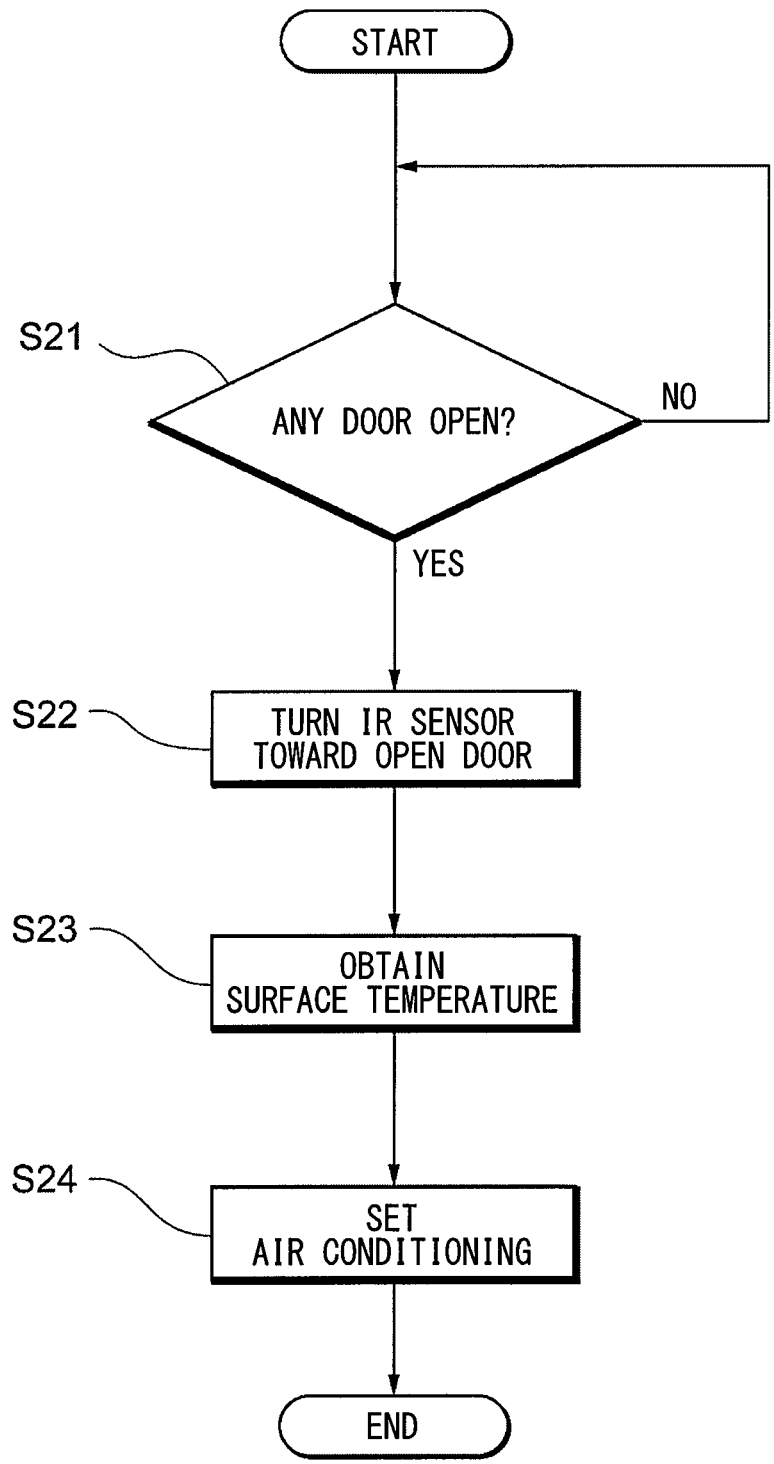
FIG. 7 is a flowchart showing a flow of a process executed by a controller of an occupant detection system.

The processing performed for that purpose will be described with reference to FIG. 7. The series of processing steps shown in FIG. 7 is repeatedly executed each time a predetermined period elapses. Further, the series of processing steps shown in FIG. 7 is executed in parallel with the series of processing steps shown in FIG. 5.

In the first step S21, it is determined whether any one of the doors D2, D3, D4 is opened or not. If none of the doors are open, the process of step S21 is repeatedly executed. If any one of the doors D2, D3, D4 is open, the process proceeds to step S22.

In step S22, the process of directing the IR sensor 131 toward the opened door (hereinafter also referred to as "open door" to distinguish it from other doors) is performed. At this time, the "initial position", which is the target position of the detection region, is set as a position where at least a part of the open door overlaps with the detection region prior to being opened. Thereafter, the sensor actuator 132 is driven so that the detection region moves toward the initial position. As already mentioned, sensing is unnecessary when moving the IR sensor 131 in the direction of the opened door, so there is no need to restrict operating speed as during normal sensing. Therefore, the IR sensor 131 may be moved as fast as possible.

Figure 8:
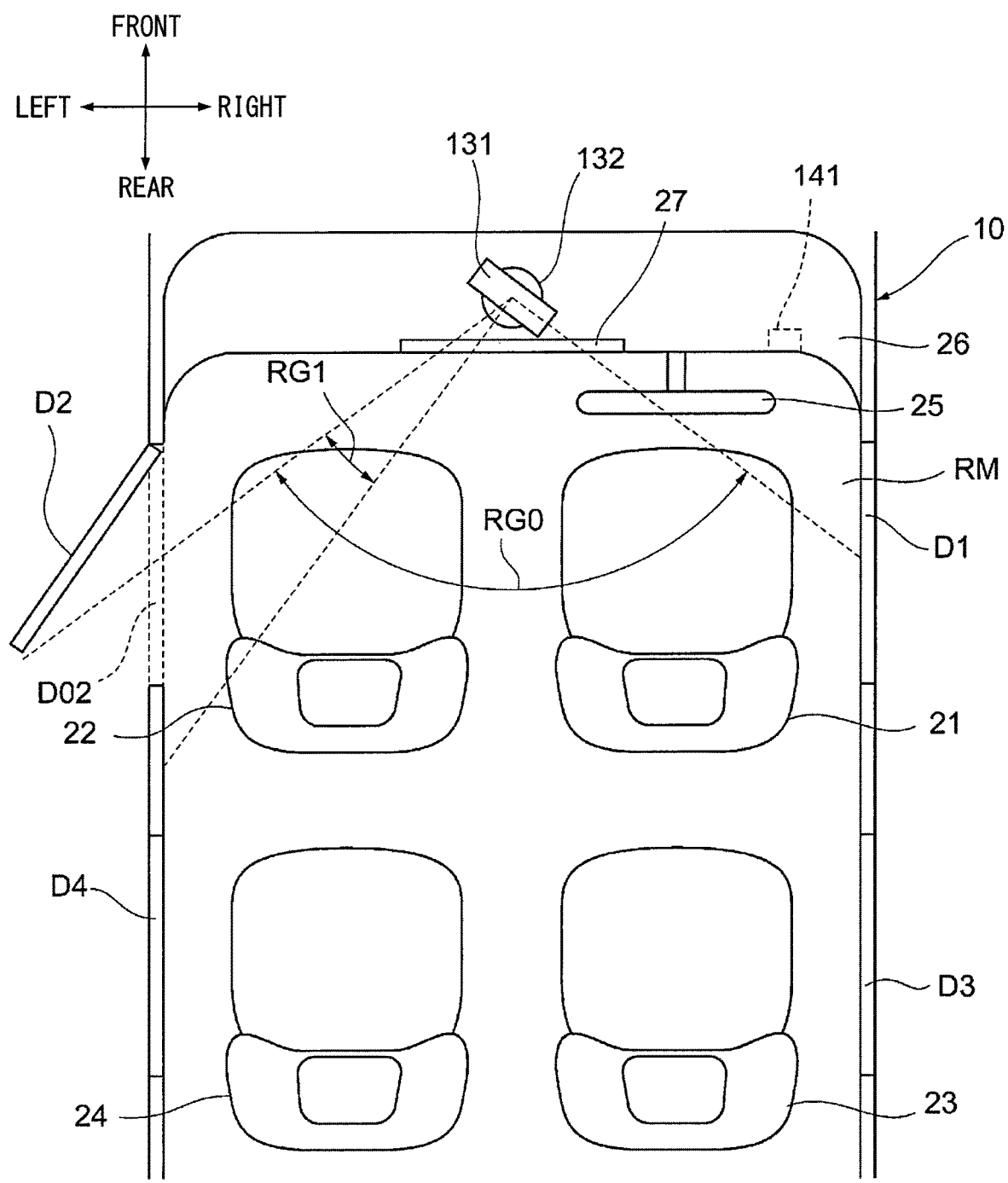
FIG. 8 is a top view diagram schematically depicting the inside of a passenger compartment of a vehicle in which an air conditioner for a vehicle is mounted.

FIG. 8 shows a state after the IR sensor 131 is directed toward the door D2 because the door D2 is opened prior to the door 1. That is, in the example of FIG. 2, the door D2 is the above mentioned open door".

As shown in FIG. 8, after the orientation of the IR sensor 131 is changed, the detection region overlaps with a part of the door D2 prior to opening. In FIG. 8, the "door D2 prior to opening" is indicated by a dotted line D02.

Returning to FIG. 7, explanation will be continued. In step S23 following step S22, the surface temperature of the occupant entering from the open door is detected by the IR sensor 131. At this point in time, the occupant is standing outside the open door, or has just sit on the seat.

In step S24 subsequent to step S23, various parameters for controlling the air conditioning mechanism unit 120 are set based on the obtained surface temperature of the occupant. Thereafter, air conditioning by the vehicular air conditioner 100 is started.

When the surface temperature of the lower body of the passenger entering from the open door is acquired in step S23, the same processing as described with reference to FIG. 6 may be performed. In other words, the controller 110 may estimate the surface temperature (change from the initial value) of the lower body after the occupant entering from the open door is seated.

Figure 9:
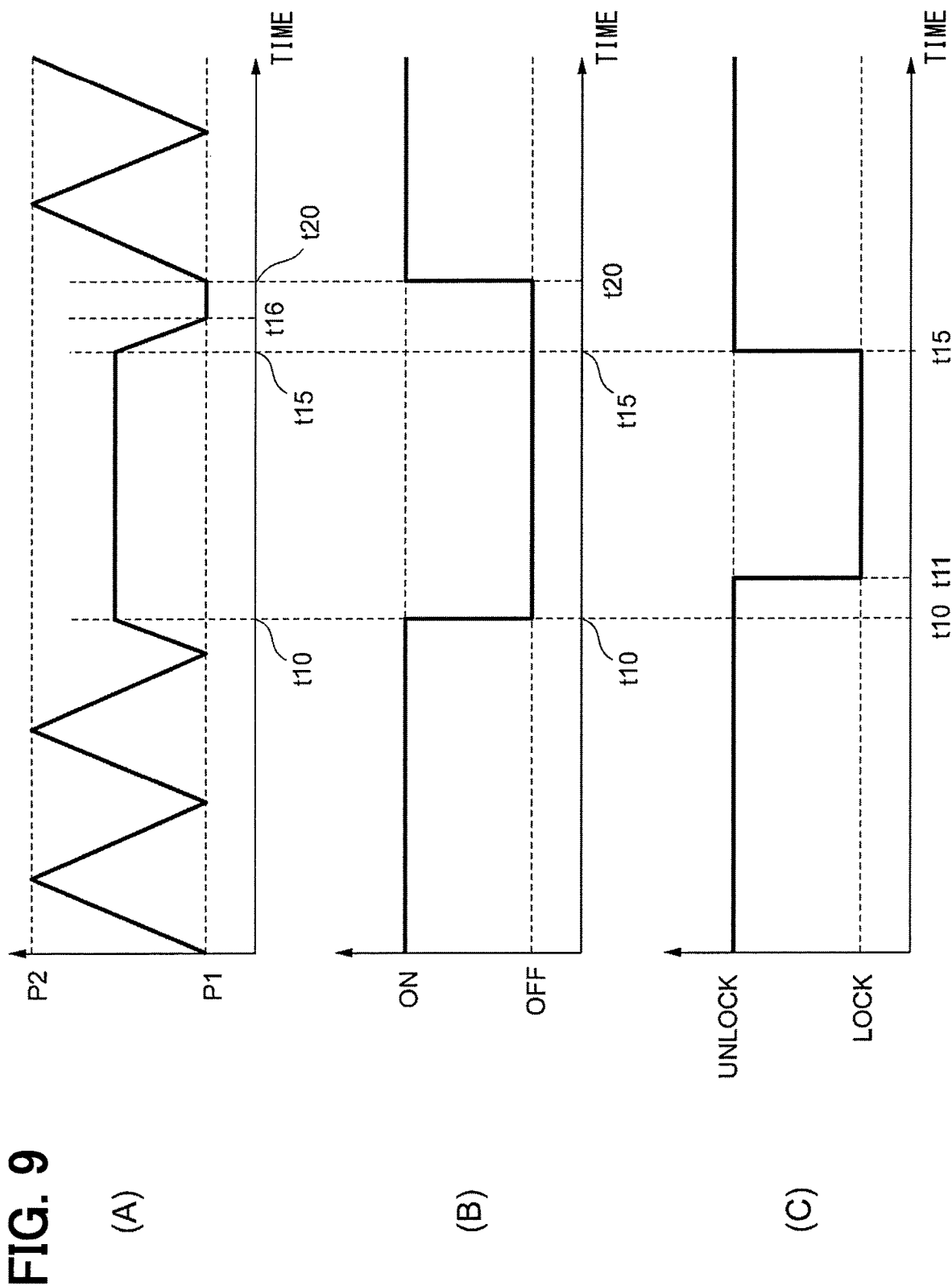
FIG. 9 is a view for explaining changes in the orientation of an IR sensor in an occupant detection system according to a second embodiment.

A second embodiment will be described with reference to FIG. 9. This embodiment is different from the first embodiment with regarding to the timing at which the detection region starts to move toward the initial position before the start switch 141 is turned on. The other controls and configurations are the same as in the first embodiment. Hereinafter, only parts different from the first embodiment will be described, and description of parts common to the first embodiment will be omitted for brevity as appropriate.

As described with reference to FIG. 3, in the first embodiment, the process of moving the detection region toward the initial position (the driver seat 21 side) is started from when the start switch 141 is turned off (time t10).

In contrast, in the second embodiment, the process of moving the detection region toward the initial position (the driver seat 21 side) is started from when the lock of the door D1 on the side of the driver seat 21 is unlocked.

The specific operations will be described. FIG. 9(A) shows change over time for the direction in which the IR sensor 131 is facing. In FIG. 9(A), the orientation of the IR sensor 131 is shown as changing between a direction P1 which is the direction of the driver M1 and a direction P2 which is the direction of the passenger M2. The specific notation method of FIG. 9(A) is the same as the notation method of FIG. 3(A).

FIG. 9(B) shows change over time for the state of the start switch 141. In FIG. 9(B), it is shown that the start switch 141 is switched from ON to OFF at time t10. After that, at time t20, it is shown that the start switch 141 is switched from OFF to ON.

FIG. 9(B) shows change over time for the lock state of the door D1. In FIG. 9(C), it is shown that the driver M1 exited the vehicle 10 and locked the door D1 at time t11 which is after time t10. Further, at time t15, which is after time t11 and before time t20, it is shown that the driver M1 has unlocked the door D1 in order to enter the vehicle 10.

In the period of time before time t10, the start switch 141 is in the ON state as described above, and air conditioning in the passenger compartment RM is performed by the vehicular air conditioner 100. At this time, the IR sensor 131 is driven by the sensor actuator 132 and performs the swinging motion as described above. Accordingly, the state in which the IR sensor 131 faces the direction P1 and the state in which the IR sensor 131 faces the direction P2 are periodically repeated. That is, the surface temperature of each part in the range RG0 is continuously scanned by the IR sensor 131.

At time t10 when the start switch 141 is turned off, the IR sensor 131 is in a state of facing between the driver seat 21 and the passenger seat 22. At this point in time, the controller 110 stops the sensor actuator 132. Therefore, in the period from time t10 to time t15, the direction of the IR sensor 131 does not change.

At time t10, the ignition switch is turned off, and after the door D1 is locked at time t15, there is no occupant in the passenger compartment RM.

Thereafter, when the vehicle 10 is used again, the driver M1 will open the door D1 to enter the vehicle 10. Prior to this, the door D1 is unlocked by the driver M1 (time t15).

When the unlocking of the door D1 is detected by the door sensor 142, the controller 110 operates the sensor actuator 132. Specifically, from the moment that the door D1 is unlocked (time t15), the direction of the IR sensor 131 is shifted toward the right side (that is, the position of the detection region is moved to the right side) so the IR sensor 131 faces in the direction P1. Thereafter, the controller 110 stops the sensor actuator 132. The time at this time is shown as time t16 in FIG. 9.

After time t16, the detection target region is positioned on the right-most side of the movable range. That is, the direction of the IR sensor 131 is oriented as shown in FIG. 4. The driver M1 opens the door D1 at a time close to the time t16 to enter the vehicle 10.

At this time, as described above, the position of the detection region overlaps with a part of the (closed) door D1. Therefore, immediately after the door D1 is opened, the surface temperature of at least a part of the driver M1 can be measured by the IR sensor 131. How the measured surface temperature is used is the same as in the case of the first embodiment.

When the driver M1 enters the vehicle 10 and the start switch 141 is turned on again (time t20), the controller 110 starts operating the sensor actuator 132. As a result, the swing motion of the IR sensor 131 is restarted, and the surface temperature of each passenger is sequentially detected.

Figure 10:
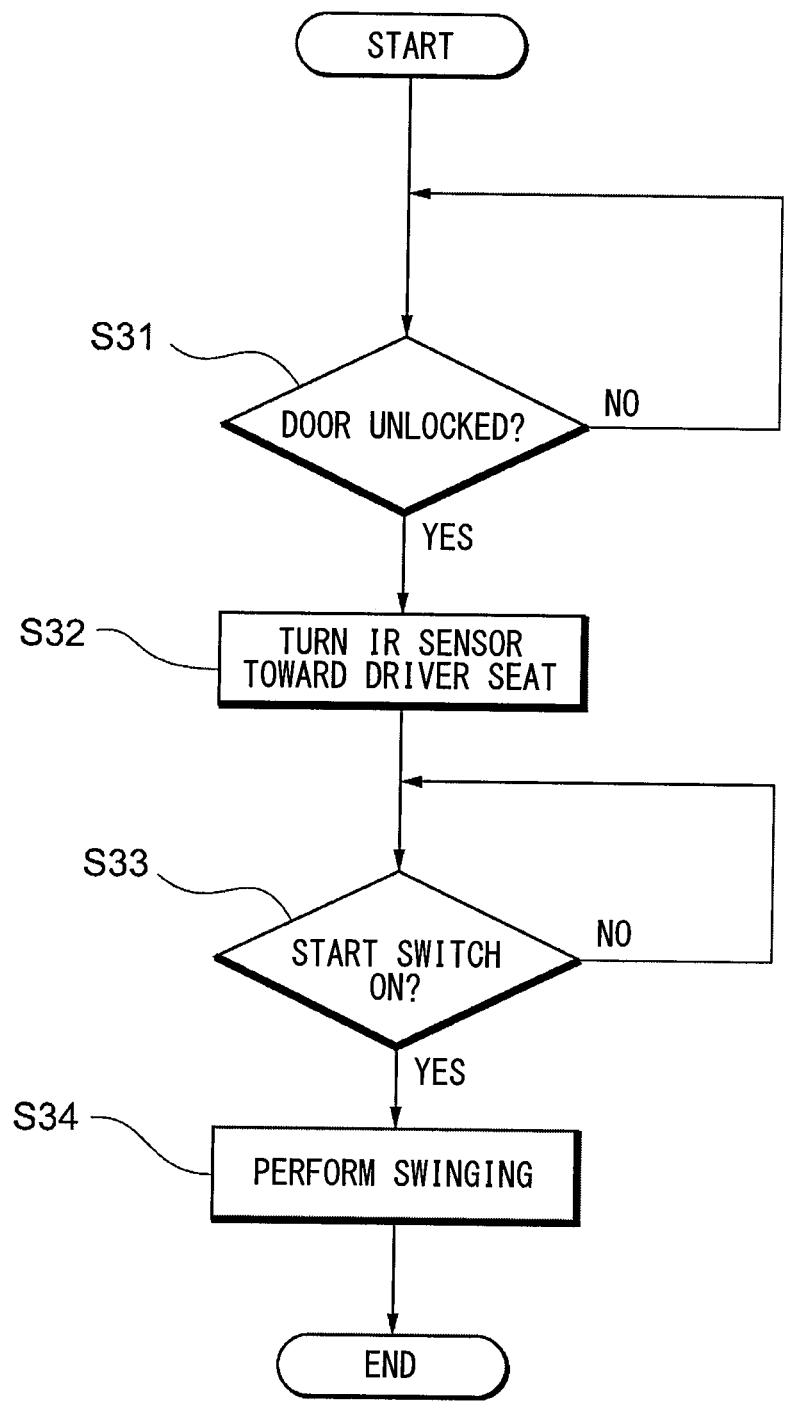
FIG. 10 is a flowchart showing a flow of a process executed by a controller of an occupant detection system.

Processing steps executed by the controller 110 will be described with reference to FIG. 10. This processing is performed after time t10 in FIG. 9 in order to operate the IR sensor 131 and the sensor actuator 132 as described above. The series of processing steps shown in FIG. 10 is repeatedly executed each time a predetermined period elapses after time t10.

In the first step S31, it is determined whether or not the lock of the door D1 is released. If the door D1 remains locked, the process of step S31 is repeatedly executed. If the door D1 is unlocked, the process proceeds to step S32.

In step S32, a process of operating the sensor actuator 132 to direct the IR sensor 131 toward the driver seat 21 is performed. Through this processing, the detection region moves toward the right side, and finally reaches the state (initial position) shown in FIG. 4. The process of step S32 corresponds to the process executed in the period from time t15 to time t16 in FIG. 9.

In step S33 following step S32, it is determined whether or not the start switch 141 is turned on. If the start switch 141 remains off, the process of step S33 is repeatedly executed. The period in which the processing of step S33 is repeatedly executed corresponds to the period from time t16 to time t20 in the example of FIG. 9. If the start switch 141 is on in step S33, the process proceeds to step S34.

In step S34, the swinging motion of the IR sensor 131 is performed. This swinging motion is the same as the operation performed in step S01 of FIG. 5 or step S05 of FIG. 5. The processing performed after proceeding to step S34 corresponds to the processing performed after time t20 in FIG. 9.

A third embodiment will be described with reference to FIG. 11. In the present embodiment, when a door next to an empty seat (such as door D2) is opened while the start switch 141 is on, a process is performed to direct the IR sensor 131 toward that door. The other controls and configurations are the same as in the first embodiment. Hereinafter, only parts different from the first embodiment will be described, and description of parts common to the first embodiment will be omitted for brevity as appropriate.

Figure 11:
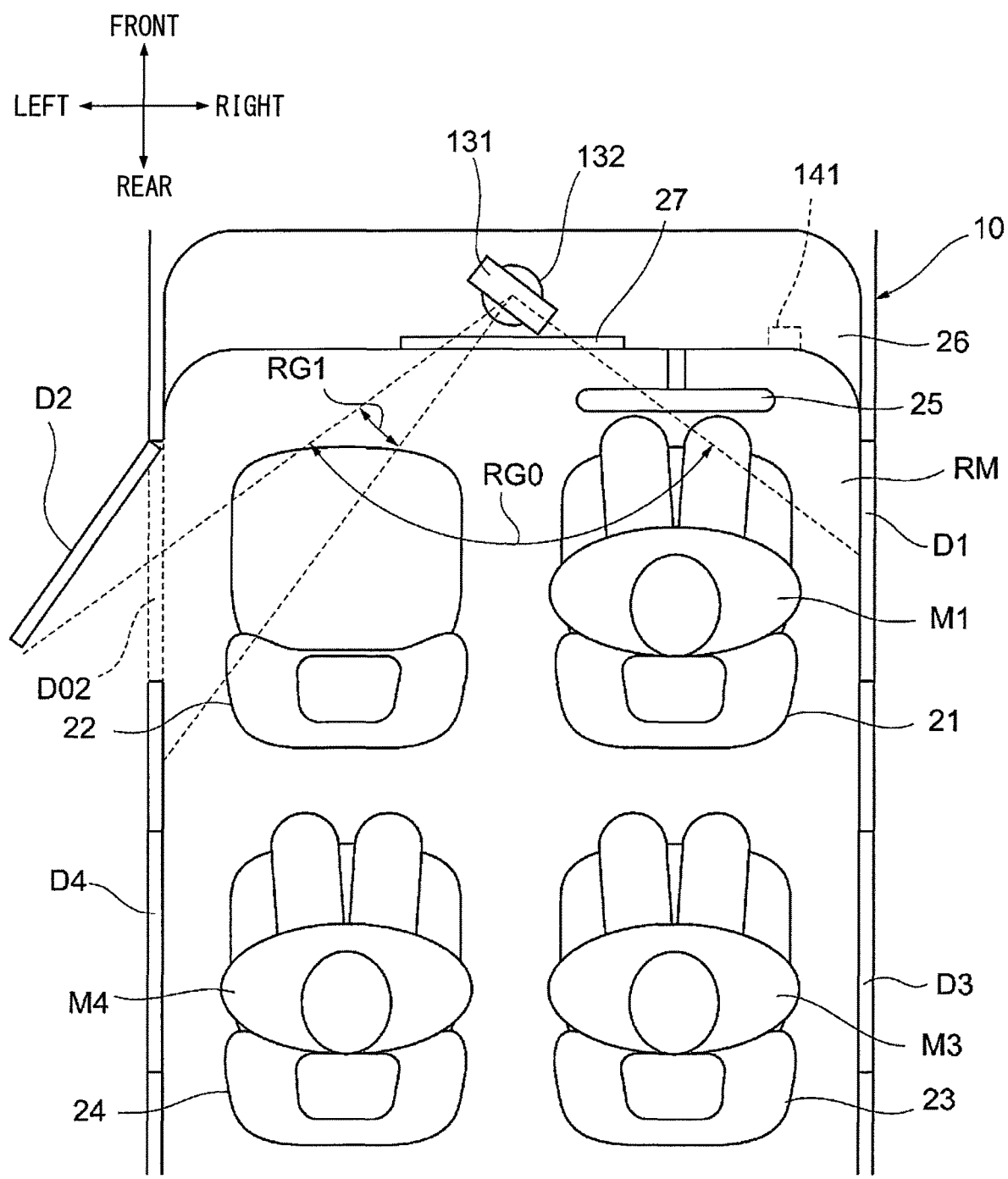
FIG. 11 is a top view diagram schematically depicting a state of a passenger compartment of a vehicle in which an occupant detection system according to a third embodiment is mounted.

FIG. 11 shows a state in which the door D2 on the side of the passenger seat 22 which is vacant has been opened while the start switch 141 is on. That is, the illustrated situation is when the vehicle 10 is momentarily stopped and immediately prior to the passenger M2 entering as a new occupant.

Until the door D2 is opened, the swinging motion of the IR sensor 131 is performed as described above. In the present embodiment, when the door D2 is opened, the swinging motion of the IR sensor 131 is stopped at that point in time. Thereafter, the controller 110 controls the operation of the sensor actuator 132 so that the detection region moves to a position overlapping with at least a part of the door D2 prior to opening. FIG. 11 shows the state at the time when the movement of the detection region as described above is completed. In FIG. 11, the "door D2 prior to opening" is indicated by a dotted line D02. As already mentioned, sensing is unnecessary when moving the IR sensor 131 in the direction of the opened door, so there is no need to restrict operating speed as during normal sensing. Therefore, the IR sensor 131 may be moved as fast as possible.

Figure 12:
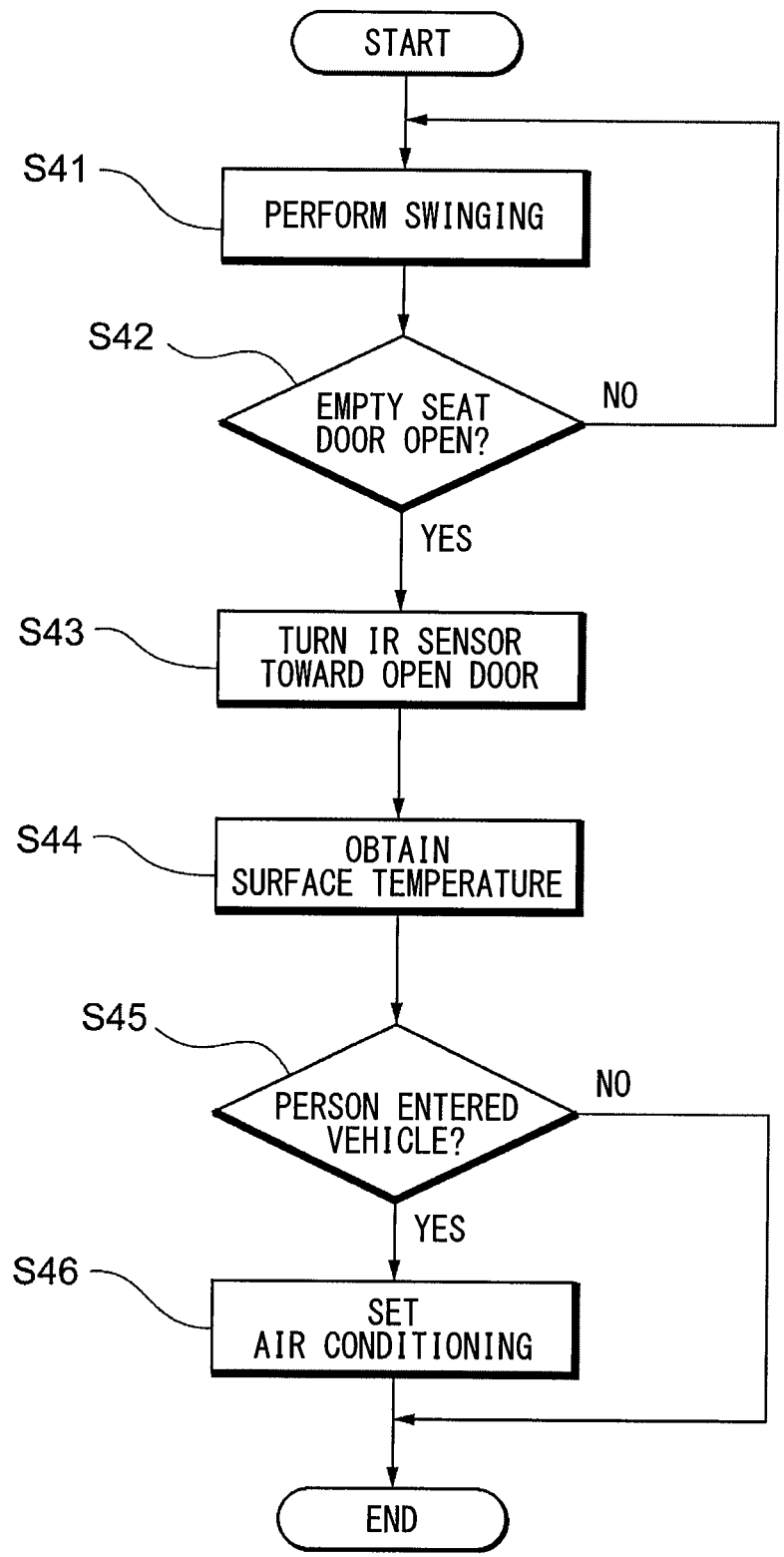
FIG. 12 is a flowchart showing a flow of a process executed by a controller of an occupant detection system.

Processing executed by the controller 110 will be described with reference to FIG. 12. The series of processing steps shown in FIG. 12 is repeatedly executed each time a predetermined period elapses while the start switch 141 is on.

In the first step S41, the swinging motion of the IR sensor 131 is performed. The swinging motion here is the same as the operation performed in step S01 of FIG. 5 or the like.

In step S42 following step S41, it is determined whether or not a door of an empty seat is opened. Further, whether or not each seat is empty can be determined based on, for example, a thermal image photographed by the IR sensor 131. When no door of an empty seat is opened, the process of step S41 is repeatedly executed. When a door of an empty seat is opened, the process proceeds to step S43.

In step S43, a process for directing the IR sensor 131 toward the opened door (open door) is performed. When the process of step S43 is performed, the detection region is positioned so as to overlap a part of the open door prior to opening (dotted line D02 in FIG. 11).

In step S44 subsequent to step S43, a thermal image including an opening formed by opening the open door is generated. At this time, if the passenger is about to enter from the open door, or if the passenger has already entered, the passenger is included in the thermal image.

In step S45 following step S44, it is determined based on the temperature distribution of the thermal image whether or not an occupant is present in the thermal image. In other words, it is determined whether or not a person has entered (or is about to enter) through the open door. If there is no passenger in the thermal image, the series of processing shown in FIG. 12 is ended. If a passenger is present in the thermal image, the process proceeds to step S46.

In step S46, various parameters for controlling the air conditioning mechanism unit 120 are set based on the thermal image generated in step S44, i.e., the surface temperature of the passenger entering from the open door. Thereafter, air conditioning by the vehicular air conditioner 100 is started. When the surface temperature of the lower body of the passenger entering from the open door is acquired in step S46, the same processing as described with reference to FIG. 6 may be performed. In other words, the controller 110 may estimate the surface temperature (change from the initial value) of the lower body after the occupant entering from the open door is seated.

As described above, in the present embodiment, the surface temperature of the nearly entered passenger is immediately measured, and appropriate air conditioning is performed based on this surface temperature. For this reason, the thermal sensation perceived by the passenger can be made appropriate from the beginning.

Further, the determination of the presence or absence of a passenger as performed in step S45 may be performed by other means. For example, while the start switch 141 is off, it is possible to constantly determine whether there is an occupant about to enter from a door when that door (D1, D2, D3, D4) is opened.

In the thermal image acquired by the IR sensor 131 facing the open door, the temperature difference between an occupant and the surrounding environment is often large. Therefore, compared to a case where the presence or absence of an occupant is determined based on a thermal image within the passenger compartment RM, the accuracy of the determination can be improved. The determination result regarding the presence or absence of a passenger may be used for air conditioning controls, but it may be used for controls other than air conditioning controls as well.

A fourth embodiment will be described with reference to FIG. 13. This embodiment is different from the first embodiment in the configuration of the sensor actuator provided for swinging the IR sensor 131. Hereinafter, only parts different from the first embodiment will be described, and description of parts common to the first embodiment will be omitted for brevity as appropriate.

Figure 13:
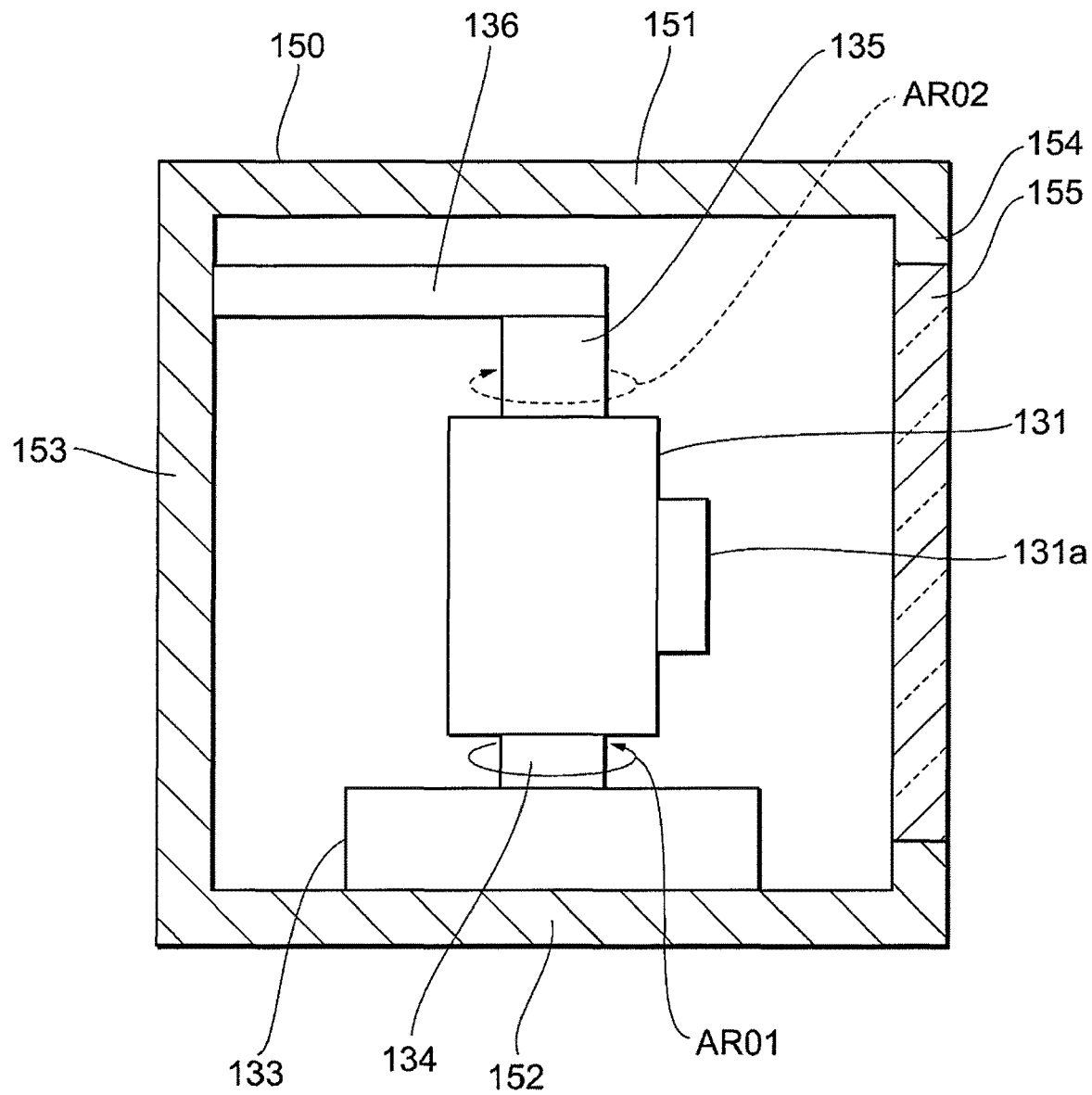
FIG. 13 is a diagram showing a configuration of an IR sensor and a sensor actuator of an occupant detection system according to a fourth embodiment.
Figure 13:
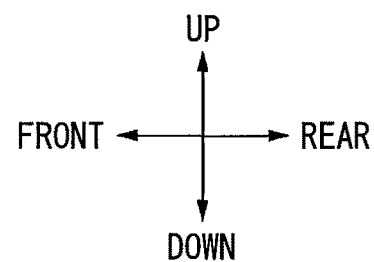

As shown in FIG. 13, the IR sensor 131 and the sensor actuator (the rotating electrical machine 133 etc.) according to the present embodiment are both housed inside a case 150.

The case 150 is a hollow container formed with an outer shape that is roughly a rectangular prism. The case 150 is installed on the top surface of the instrument panel 26. In FIG. 13, the left direction is the front direction of the vehicle 10 and the right direction is the rear direction of the vehicle 10. FIG. 13 shows cross sections of a top plate 151, a bottom plate 152, a front plate 153, and a rear plate 154 included in the case 150.

The top plate 151 is the upper-most part of the case 150. The top plate 151 is disposed substantially along the horizontal plane. The bottom plate 152 is the lower-most part of the case 150. The bottom plate 152 is a portion directly attached to the top surface of the instrument panel 26 and is arranged to face the top plate 151.

The front plate 153 is the front-most part of the case 150. The front plate 153 is one of the plates forming the sides of the case 150, and is disposed so as to face a windshield (not shown).

The rear plate 154 is a rear-most part of the case 150. The front plate 153 is one of the plates forming the sides of the case 150, and is arranged to face the front plate 153. As a result, the rear plate 154 is directed toward the driver seat 21 and the passenger seat 22 on the rear side thereof.

A rectangular opening is formed in the rear plate 154, and a transparent plate 155 is fitted in this opening. The transparent plate 155 is made of a material transparent to infrared rays (for example, glass). The transparent plate 155 suppresses intrusion of foreign matter into the inside of the case 150, while transmission of infrared rays is allowed. Detection of surface temperature by the IR sensor 131, that is, reception of infrared rays is performed through the transparent plate 155.

The IR sensor 131 is retained at a center position in the height direction of the case 150. The IR sensor 131 includes a light receiving surface 131a facing the transparent plate 155.

The rotating electrical machine 133 is installed on the bottom plate 152. The rotating electrical machine 133 has an output shaft 134. The output shaft 134 is a cylindrical member arranged such that the center axis thereof is along a normal direction of the bottom plate 152 (that is, the up-down direction). When the rotating electrical machine 133 is operating, the output shaft 134 rotates about its center axis. The IR sensor 131 is fixed to the upper end of the output shaft 134, and rotates together with the output shaft 134 to change its direction.

A lower end of a support shaft 135, which is a cylindrical member, is fixed to the upper end of the IR sensor 131. The center axis of the support shaft 135 coincides with the center axis of the output shaft 134. Therefore, when the rotating electrical machine 133 operates and the direction of the IR sensor 131 changes, the support shaft 135 also rotates about its center axis.

A spiral spring 136 is provided at the upper end of the support shaft 135. A part of the spiral spring 136 is fixed with respect to the support shaft 135, and another portion of the spiral spring 136 is fixed to the front plate 153. When the support shaft 135 is rotated by the rotating electrical machine 133, this causes elastic deformation of the spiral spring 136, and an elastic force (also called restoring force) is generated to rotate the support shaft 135 in the reverse direction. For example, when the output shaft 134 rotates in the direction of the arrow AR01 in FIG. 13, an elastic force is generated in the spiral spring 136 so as to rotate the support shaft 135 in the direction of the arrow AR02 (in the opposite direction as the arrow AR01). Therefore, when the power supply to the rotating electrical machine 133 is subsequently stopped, the support shaft 135 rotates in the direction of the arrow AR02 due to the elastic force of the spiral spring 136. As a result, the direction of the IR sensor 131 is returned to a neutral position where the elastic force of the spiral spring 136 becomes zero. The rotating electrical machine 133, the output shaft 134, the support shaft 135, and the spiral spring 136 correspond to a sensor actuator according to the present embodiment, i.e., a "detection region changing unit".

In the present embodiment, the elastic force of the spiral spring 136 is set to be zero when the detection region is in the range RG1 in FIG. 4. In other words, when power supply to the rotating electrical machine 133 is stopped, the position of the detection region is returned to the initial position by the elastic force of the spiral spring 136 alone. As described above, this initial position is set such that the detection region of the IR sensor 131 overlaps with at least a part of the door D1 provided on the driver seat side of the vehicle 10.

When the power supply to the rotating electrical machine 133 (actuator) is stopped, such a spiral spring 136 returns the position of the detection region to the initial position by elastic force. Accordingly, the spiral spring 136 corresponds to a "restoring mechanism" in the present embodiment.

In the present embodiment as well, processing steps similar to that shown in FIG. 5 are performed. In step S03 of FIG. 5, similarly to the first embodiment, control of the rotating electrical machine 133 by the controller 110 is performed, so that the detection region may be returned to the initial position. In an alternative implementation, in step S03, the power supply to the rotating electrical machine 133 may be stopped. For example, when the start switch 141 is turned off in step S02, the power supply to the controller 110 and the rotating electrical machine 133 may be stopped.

In this case as well, the detection region is returned to the initial position by the elastic force of the spiral spring 136 alone. Thus, the same effect as that described in the first embodiment can be obtained. Further, in this case, since energization of the rotating electrical machine 133 is not performed, there is also an advantage in that the life of the rotating electrical machine 133 is improved.

Further, as an alternative embodiment, the initial position of the detection region may be set such that the body of the driver M1 seated in the driver seat 21 is included in the detection region. In other words, the elastic force of the spiral spring 136 may be set to be zero when the IR sensor 131 is able to obtain the surface temperature of the driver M1 when driving.

In such a configuration, even if a malfunction occurs in the rotating electrical machine 133 and the direction of the IR sensor 131 can not be controlled, it is possible to continue to measure the surface temperature of the driver M1.

A fifth embodiment will be described with reference to FIG. 14. This embodiment is different from the fourth embodiment in the configuration of the sensor actuator provided for swinging the IR sensor 131. Hereinafter, only parts different from the fourth embodiment will be described, and description of parts common to the first embodiment will be omitted for brevity as appropriate.

Figure 14:
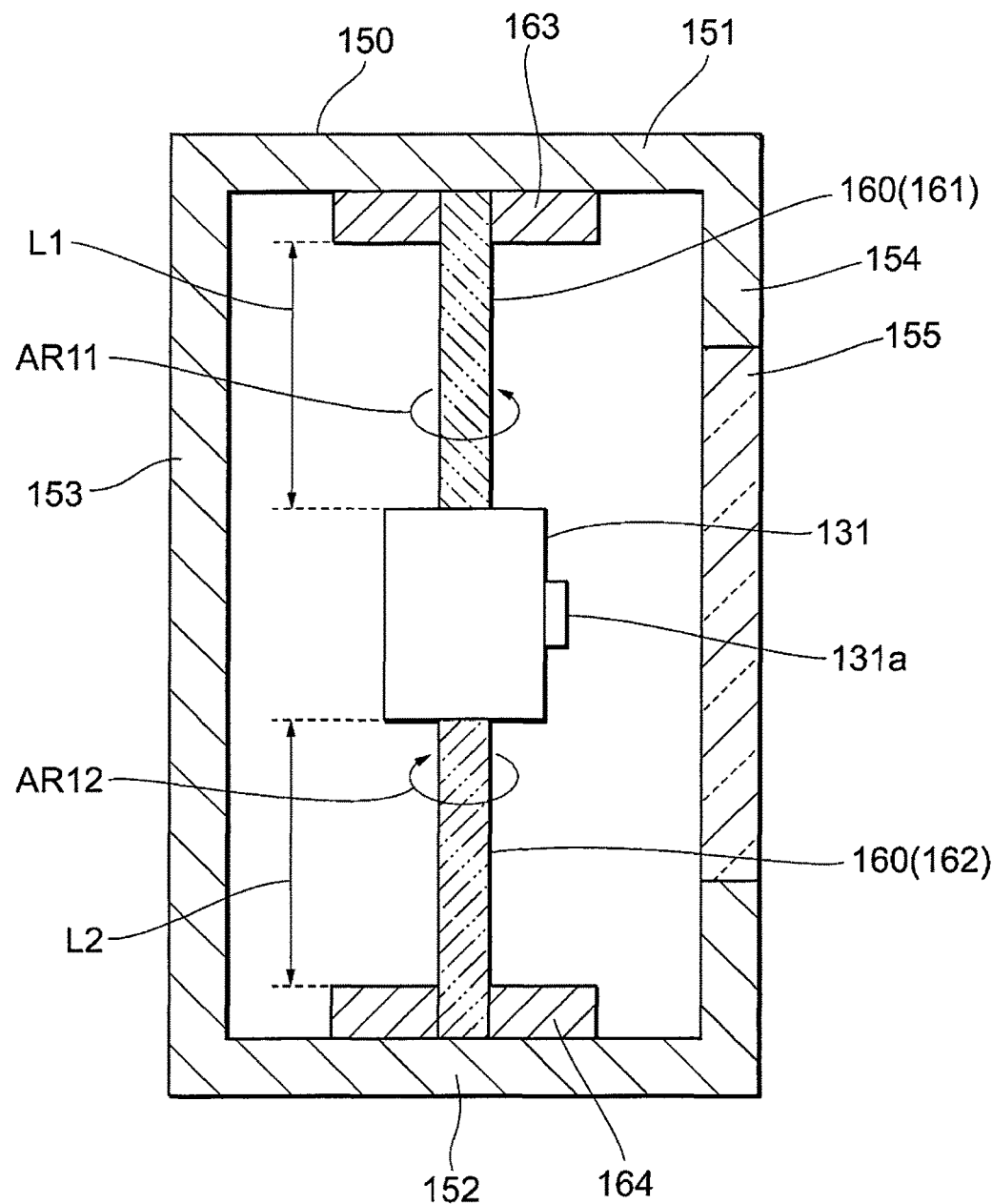
FIG. 14 is a diagram showing a configuration of an IR sensor and a sensor actuator of an occupant detection system according to a fifth embodiment.
Figure 14:
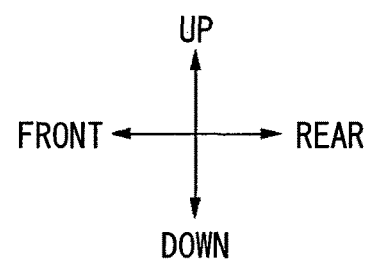

As shown in FIG. 14, the IR sensor 131 and the sensor actuator (a polymer fiber actuator 160 etc.) according to the present embodiment are both housed inside a case 150. In FIG. 14, only the polymer fiber actuator 160 of the sensor actuator is shown, and other portions are not shown.

The polymer fiber actuator 160 is an actuator formed by twisting a fiber made of a polymer material such as polyamide in a helical shape so that its overall shape is roughly a rod shape (straight shape). The outer side of this fiber is coated with a metal. The polymer fiber actuator 160 becomes deformed according to externally supplied thermal energy. Specifically, when an electric current is applied to the coating by a heating device (not shown), the temperature of the polymer fiber actuator 160 rises due to Joule heating, and the fibers contract. As a result, a force is generated in the polymer fiber actuator 160 such that the tip portions of the polymer fiber actuator 160 rotate in the twisting direction. The supply of thermal energy to the polymer fiber actuator 160 by the heating device (that is, supply of current) is controlled by the controller 110. The polymer fiber actuator 160 and the heating device (not shown) correspond to a sensor actuator in this embodiment, i.e., a "detection region changing unit".

The polymer fiber actuator 160 in the present embodiment includes a first drive unit 161 connecting the IR sensor 131 to the top plate 151, and a second drive unit 162 connecting the IR sensor 131 to the bottom plate 152. The first drive unit 161 and the second drive unit 162 are disposed in a state in which their central axes are aligned with each other. An upper end of the first drive unit 161 is fixed to the top plate 151 by a fixing member 163, and a lower end of the first drive unit 161 is fixed to the upper surface of the IR sensor 131. Further, the lower end of the second drive unit 162 is fixed to the bottom plate 152 by a fixing member 164, and the upper end of the second drive unit 162 is fixed to the lower surface of the IR sensor 131.

The orientation direction of the molecules in the first drive unit 161 (that is, the twist direction) is opposite to the orientation direction of the molecules in the second drive unit 162. Therefore, a direction (arrow AR11) in which a rotational force is applied from the first drive unit 161 to the IR sensor 131 when thermal energy is supplied to the first drive unit 161 is opposite to a direction (arrow AR12) in which a rotational force is applied from the second drive unit 162 to the IR sensor 131 when thermal energy is supplied to the second drive unit 162. The controller 110 controls the operation of the IR sensor 131 by adjusting the magnitude of thermal energy applied to each of the first drive unit 161 and the second drive unit 162.

In this regard, as described above, the polymer fiber actuator 160 according to the present embodiment includes the first drive unit 161 for moving the detection region in the first direction (the arrow AR11) when supplied with thermal energy, and the second drive unit 162 for moving the detection region in a second direction (arrow AR12) when supplied with thermal energy. The second direction is a direction opposite to the first direction.

When thermal energy is not supplied to either the first drive unit 161 or the second drive unit 162, the direction of the IR sensor 131 is orientated so as to be balanced between the rotational force of the first drive unit 161 and the rotational force of the second drive unit 162. In the present embodiment, when thermal energy is not supplied to the first drive unit 161 or the second drive unit 162, as described above, the two rotational forces are balanced so that the detection region by the IR sensor 131 is within the range RG1 as shown in FIG. 4. That is, the detection region is configured to return to the initial position.

In the present embodiment as well, processing steps similar to that shown in FIG. 5 are performed. In step S03 of FIG. 5, control of the polymer fiber actuator 160 by the controller 110 (that is, adjustment of heating energy) may be performed so that the detection area is returned to the initial position. In an alternative implementation, in step S03, the power supply to the polymer fiber actuator 160 may be stopped. For example, when the start switch 141 is turned off in step S02, the power supply to the controller 110, the first drive unit 161, and the second drive unit 162 may be stopped.

In this case as well, the detection region is returned to the initial position by the elastic force of the polymer fiber actuator 160 alone. Thus, the same effect as that described in the first embodiment can be obtained. In addition, in this case, since current is not supplied to the polymer fiber actuator 160, there is also the advantage in that the lifespan of the polymer fiber actuator 160 is improved.

Further, as an alternative embodiment, the initial position of the detection region may be set such that the body of the driver M1 seated in the driver seat 21 is included in the detection region. In other words, when the power supply to the first drive unit 161 and the second drive unit 162 is stopped and the rotational forces of the first and second drive units 161 and 162 are balanced, the IR sensor 131 is able to measure the surface temperature of the driver M1 when driving.

In such a configuration, even if a malfunction occurs in the heating device of the polymer fiber actuator 160 and the direction of the IR sensor 131 can not be controlled, it is possible to continue to measure the surface temperature of the driver M1. In addition, when the temperature in the passenger compartment RM rises and the polymer fiber actuator 160 can not be properly operated, heating to the polymer fiber actuator 160 is temporarily stopped. Even in this case, with the above configuration, it is possible to continue to measure the surface temperature of the driver M1.

In the configuration shown in FIG. 14, when moving the detection region in the first direction (arrow AR11), thermal energy may be supplied only to the first drive unit 161, and when moving the detection region in the second direction (arrow AR12), thermal energy may be supplied only to the second drive unit 162. As described above, when thermal energy is supplied to only one of the first drive unit 161 or the second drive unit 162, elastic deformation is generated in the other drive unit due to twisting, and an elastic force (also referred to as a restoring force) is generated so as to rotate the IR sensor 131 in the reverse direction. That is, the one of the first drive unit 161 or the second drive unit 162 to which thermal energy is not applied functions as a "restoring mechanism" similar to the spiral spring 136 in the fourth embodiment (FIG. 13)

In the present embodiment, the length L1 of the first drive unit 161 and the length L2 of the second drive unit 162 are equal to each other. Therefore, for example, if the IR sensor 131 and the polymer fiber actuator 160 are turned upside down together with the case 150, the initial position of the detection area can be reversed horizontally without changing the height of the IR sensor 131 in the passenger compartment RM. Accordingly, the IR sensor 131, the polymer fiber actuator 160, etc. which are configured for right-hand drive vehicles can be applied as is for left-hand drive vehicles. As a result, since components are shared, the cost of the occupant detection system 101 can be reduced.

Further, the rotational speed of the IR sensor 131 when driven by the polymer fiber actuator 160 is lower than the rotational speed of the IR sensor 131 when driven by the rotating electrical machine. Therefore, if a polymer fiber actuator 160 is used as in the present embodiment, the advantage of moving the orientation of the IR sensor 131 to an appropriate initial position prior to the start switch 141 being turned on is especially great.

A sixth embodiment will be described with reference to FIG. 15. The present embodiment is different from the fifth embodiment in the internal configuration of the case 150. Hereinafter, only parts different from the fifth embodiment will be described, and description of parts common to the first embodiment will be omitted for brevity as appropriate.

Figure 15:
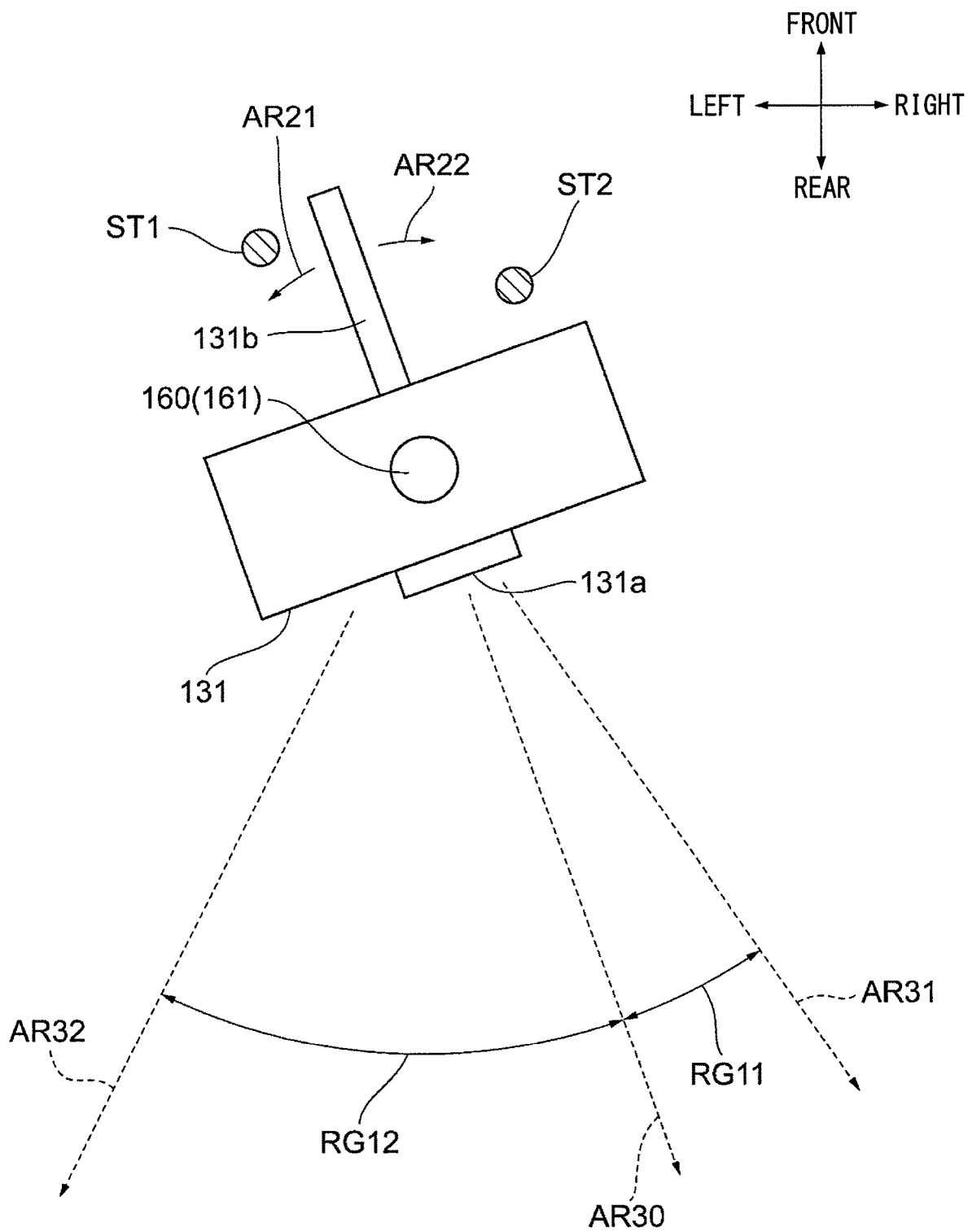
FIG. 15 is a diagram showing a configuration of an IR sensor and a sensor actuator of an occupant detection system according to a sixth embodiment.

In FIG. 15, the IR sensor 131 and the first drive unit 161 and the like accommodated in the case 150 are illustrated in a top view. Further, that illustration of the case 150 itself is omitted. As shown in the figure, a stopper 131b is provided on the rear surface of the IR sensor 131, i.e., the surface opposite to the light receiving surface 131a. The stopper 131b is a rod-shaped member and is fixed in a state in which its longitudinal direction is perpendicular to the rear surface of the IR sensor 131.

Inside the case 150, stoppers ST1 and ST2 are provided. Both of these are rod-shaped members extending in the vertical direction, the upper ends of which are fixed to the top plate 151, and the lower ends of which are fixed to the bottom plate 152.

A dotted arrow AR30 shown in FIG. 15 indicates a direction passing through the center of the light receiving surface 131a and perpendicular to the light receiving surface 131a. That is, the arrow AR30 is an arrow extending toward the center of the detection region. The direction indicated by the arrow AR30 is also referred to as a "detection direction" in the following explanation. When the IR sensor 131 is swung by the polymer fiber actuator 160, the detection direction indicated by the arrow AR30 changes toward the left and right.

The dotted arrow AR31 shown in FIG. 15 indicates the detection direction when the detection region is moved to the rightmost side. When the detection direction is in the direction of the arrow AR31, the detection region overlaps at least a part of the door D1 on the driver seat side provided in the vehicle 10. In addition, a dotted arrow AR32 shown in FIG. 15 indicates a detection direction when the detection region is moved to the leftmost side. When the detection direction is in the direction of the arrow AR32, the detection region overlaps at least a part of the door D2 on the passenger seat side provided in the vehicle 10.

In the state shown in FIG. 15, the detection direction is a direction toward the body of the driver M1 seated in the driver seat 21. In the present embodiment, the position of the detection region in this state is set to be the initial position. The initial position corresponds to the position of the detection region when thermal energy is not supplied to the first drive unit 161 and the second drive unit 162 (that is, a state in which the rotational forces of the first drive unit 161 and the second drive unit 162 are in equilibrium).

From the state shown in FIG. 15, when changing the detection direction to the right side, thermal energy is applied to only the first drive unit 161 of the polymer fiber actuator 160. As a result, in the top view, a driving force in the counterclockwise direction is generated in the first drive unit 161, and the direction of the IR sensor 131 changes in this direction. At that time, the stopper 131b moves in the direction of the arrow AR21 and finally comes into contact with the stopper ST1. In this manner, the position of the rightmost end of the range in which the detection region can vary is determined by the stopper ST1.

From the state shown in FIG. 15, when changing the detection direction to the left side, thermal energy is applied to only the second drive unit 162 of the polymer fiber actuator 160. As a result, in the top view, a driving force in the clockwise direction is generated in the second drive unit 162, and the direction of the IR sensor 131 changes in the same direction. At that time, the stopper 131b moves in the direction of the arrow AR22 and finally comes into contact with the stopper ST2. In this manner, the position of the leftmost end of the range in which the detection region can vary is determined by the stopper ST2.

The stoppers ST1, ST2, and the stopper 131b are disposed so that the detection region falls within a predetermined range (specifically, the detection direction is within a range such that the detection direction is within the range from the arrow AR31 to the arrow AR32) to function as a unit that restrictions a range of operation of the IR sensor 131 (state detection unit).

In the present embodiment, a movement range RG11 for the detection direction when moving from the neutral position to the right side in FIG. 15 and a movement range RG12 for the detection direction when moving from the neutral position to the left side in FIG. 15 are asymmetrical with each other.

If the magnitude of thermal energy applied to the first drive unit 161 when changing the detection direction toward the right side and the magnitude of thermal energy applied to the second drive unit 162 when changing the detection direction toward the left side are set to be equal to each other, the configuration and control of the sensor actuator can be simplified. However, if the above control is performed in a state where the stopper ST1 etc. are not provided, the movement range of the detection direction becomes symmetrical in the left-right direction.

In the present embodiment, since the stopper ST1 etc. for restricting the operation range of the IR sensor 131 are provided, the magnitude of thermal energy applied to the first drive unit 161 when changing the detection direction toward the right side and the magnitude of thermal energy applied to the second drive unit 162 when changing the detection direction toward the left side may be set to be equal to each other, and at the same time the movement range of the detecting direction may be set to be asymmetric in the left-right direction. As a result, it is possible to change the detection direction within an appropriate range.

It should be noted that the longer the length of the polymer fiber actuator 160, the larger the operation amount when thermal energy is applied. Also, the smaller the thickness, the larger the operation amount when thermal energy is applied.

Therefore, the length of the second drive unit 162 that changes the detection direction in the relatively wide movement range RG12 may be made longer than the length of the first drive unit 161 that changes the detection direction in the relatively narrow movement range RG11. In an alternative embodiment, or in addition to such an embodiment, the thickness of the second drive unit 162 that changes the detection direction in the relatively wide movement range RG12 may be thinner than the thickness of the first drive unit 161 that changes the detection direction in the comparatively narrow movement range RG11. This makes it possible to make the operation of the IR sensor 131 more appropriate when thermal energy is applied to the polymer fiber actuator 160.

In the above description, an example in which the IR sensor 131 is used as the state detection unit is described, but other sensors can be used as a state detection unit. For example, a CCD camera or the like for taking an image including an occupant may be used as the state detection unit. The occupant detection system 101 in that case may be configured to identify an occupant based on facial recognition of the occupant captured by the state detection unit and perform automatic setting of a seat position or the like according to the occupant. In this case as well, by performing the same control as above, the controller 110 may perform the automatic setting of the facial recognition and the seat position according to the occupant immediately before the passenger opens and enters through the door D1 etc.

In this regard, the state detection unit in the occupant detection system 101 may detect the state of an object (including an occupant) in a specific direction in a non-contact manner. The "state of the object" referred to here includes the surface temperature and shape of the object, the presence or absence of the object, etc.

The present embodiments have been described with reference to specific examples above. However, the present disclosure is not limited to these specific examples. Those skilled in the art appropriately design modifications to these specific examples, which are also included in the scope of the present disclosure as long as they have the features of the present disclosure. The elements, the arrangement, the conditions, the shape, etc. of the specific examples described above are not limited to those exemplified and can be appropriately modified. The combinations of elements included in each of the above described specific examples can be appropriately modified as long as no technical inconsistency occurs.

What is claimed is:

1. An occupant detection system provided in a vehicle that detects a state of an occupant, comprising:
    a state detection unit that detects a state of an object;
    a detection position changing unit that changes a position of a detection region, the detection region being a region in which state is detected by the state detection unit; and
    a controller that controls an operation of the detection position changing unit, wherein
    a position of the detection region is set to a predetermined initial position during a period of time from when a start switch provided in the vehicle is turned off until when the start switch is turned on, and
    the controller causes the detection region to start to move toward the initial position upon a door provided in the vehicle being unlocked and prior to the door being opened.

2. The occupant detection system of claim 1, wherein the detection position changing unit includes an actuator that operates when supplied with electric power to change the position of the detection region.

3. The occupant detection system of claim 2, wherein the controller controls the operation of the actuator such that the position of the detection region reaches the predetermined initial position during the period of time from when the start switch is turned off until when the start switch is turned on.

4. The occupant detection system of claim 2, wherein the detection position changing unit includes a restoring mechanism that returns the position of the detection region to the initial position by elastic force when power supply to the actuator is stopped.

5. The occupant detection system of claim 2, wherein the actuator is a polymer fiber actuator that deforms according to externally supplied thermal energy.

6. The occupant detection system of claim 5, wherein the actuator includes
    a first drive unit that moves the detection region in a first direction when supplied with external thermal energy, and
    a second drive unit that moves the detection region in a second direction, which is a direction opposite to the first direction, when supplied with external thermal energy.

7. The occupant detection system of claim 6, wherein one of the first drive unit or the second drive unit is configured to function as a restoring mechanism that returns the position of the detection region to the initial position by elastic force when supply of thermal energy to the actuator is stopped.

8. The occupant detection system of claim 7, further comprising:

a stopper that restricts an operating range of the state detection unit such that the detection region falls within a predetermined range.

9. The occupant detection system of claim 7, wherein the first drive unit and the second drive unit are different from each other in at least one of a length or a thickness thereof.

10. The occupant detection system of claim 7, wherein the first drive unit and the second drive unit are equal to each other in length.

11. The occupant detection system according to claim 1, wherein
the state detection unit detects a surface temperature of the object based on radiation from the object.

12. The occupant detection system of claim 11, wherein the detection region overlaps with at least a part of a driver seat door among doors provided in the vehicle.

13. The occupant detection system of claim 12, wherein when the start switch is on, the controller is configured to control the operation of the detection position changing unit such that the position of the detection region periodically changes to detect the surface temperature of each passenger present in a passenger compartment.

14. The occupant detection system of claim 13, wherein when a vacant seat door, which is a door adjacent to a seat in which an occupant is not seated among the doors installed in the vehicle, is opened, the controller is configured to control the operation of the detection position changing unit such that the detection region moves to a position overlapping with at least a part of the vacant seat door prior to opening and then stops.

15. The occupant detection system of claim 12, wherein the controller determines the presence or absence of an occupant who opens a door provided in the vehicle to enter the vehicle based on a distribution of surface temperature in the detection region.

16. The occupant detection system of claim 12, wherein the controller causes the detection region to start to move toward the initial position upon the start switch being turned off.

17. The occupant detection system of claim 12, wherein prior to the start switch being turned on, when a door provided in the vehicle is opened, the controller is configured to set the initial position such that the detection region overlaps with at least a part of the door before being opened and then control the operation of the detection position changing unit such that the position of the detection region reaches the initial position.

18. A vehicular air conditioner including the occupant detection system of claim 11.

19. The vehicular air conditioner of claim 18, wherein
the initial position is a position where the detection region overlaps with at least a part of a driver side door among doors provided in the vehicle, and
the controller is configured to perform air conditioning control based on a surface temperature of a driver detected when the driver seat door among the doors installed in the vehicle is opened.

20. The vehicular air conditioner according to claim 19, wherein
the surface temperature of the driver detected when the driver seat door is opened includes the surface temperature of a lower body of the driver.

21. An occupant detection system provided in a vehicle that detects a state of an occupant, comprising:
a state detection unit that detects a state of an object;
a detection position changing unit that changes a position of a detection region, the detection region being a region in which state is detected by the state detection unit; and
a controller that controls an operation of the detection position changing unit, wherein
a position of the detection region is set to a predetermined initial position during a period of time from when a start switch provided in the vehicle is turned off until when the start switch is turned on,
the detection position changing unit includes an actuator that operates when supplied with electric power to change the position of the detection region, and
the controller controls the operation of the actuator such that the position of the detection region reaches the predetermined initial position during the period of time from when the start switch is turned off until when the start switch is turned on.

22. An occupant detection system provided in a vehicle that detects a state of an occupant, comprising:
a state detection unit that detects a state of an object;
a detection position changing unit that changes a position of a detection region, the detection region being a region in which state is detected by the state detection unit; and
a controller that controls an operation of the detection position changing unit, wherein
a position of the detection region is set to a predetermined initial position during a period of time from when a start switch provided in the vehicle is turned off until when the start switch is turned on,
the detection position changing unit includes an actuator that operates when supplied with electric power to change the position of the detection region, and
the detection position changing unit includes a restoring mechanism that returns the position of the detection region to the initial position by elastic force when power supply to the actuator is stopped.

* * * * *